(12) United States Patent
Li

(10) Patent No.: US 12,483,610 B2
(45) Date of Patent: Nov. 25, 2025

(54) DATABASE FILE BACKUP METHOD AND APPARATUS, AND ELECTRONIC DEVICE

(71) Applicant: Petal Cloud Technology Co., Ltd., Dongguan (CN)

(72) Inventor: Xuefeng Li, Nanjing (CN)

(73) Assignee: Petal Cloud Technology Co., Ltd., Dongguan (CN)

(*) Notice: Subject to any disclaimer, the term of this patent is extended or adjusted under 35 U.S.C. 154(b) by 149 days.

(21) Appl. No.: 17/914,255

(22) PCT Filed: Mar. 11, 2021

(86) PCT No.: PCT/CN2021/080093
§ 371 (c)(1),
(2) Date: Sep. 23, 2022

(87) PCT Pub. No.: WO2021/190313
PCT Pub. Date: Sep. 30, 2021

(65) Prior Publication Data
US 2023/0114452 A1    Apr. 13, 2023

(30) Foreign Application Priority Data

Mar. 25, 2020  (CN) .......................... 202010218981.2

(51) Int. Cl.
*H04L 65/401* (2022.01)
*G06F 11/14* (2006.01)
(Continued)

(52) U.S. Cl.
CPC ...... *H04L 65/4015* (2013.01); *G06F 11/1451* (2013.01); *G06F 11/1464* (2013.01);
(Continued)

(58) Field of Classification Search
CPC . H04L 65/4015; H04L 67/06; H04L 67/1097; G06F 11/1451; G06F 11/1464;
(Continued)

(56) References Cited

U.S. PATENT DOCUMENTS 7,761,425 B1 * 7/2010 Erickson ............. G06F 11/1464
707/649
8,041,675 B1   10/2011 McCain
(Continued)

FOREIGN PATENT DOCUMENTS

CN   101599079 A   12/2009
CN   103176867 A   6/2013
(Continued)

OTHER PUBLICATIONS

Shu et al., "Why Data Deletion Fails? A Study on Deletion Flaws and Data Remanence in Android Systems," ACM Transactions on Embedded Computing Systems, ACM, vol. 16, No. 2, XP058676851, New York, NY, US, Total 22 pages (Jan. 10, 2017).

*Primary Examiner* — Matthew M Kim
*Assistant Examiner* — Matthew N Putaraksa
(74) *Attorney, Agent, or Firm* — Leydig, Voit & Mayer, Ltd.

(57) ABSTRACT

A database (DB) file backup method and apparatus, and an electronic device are provided. The method includes: an electronic device segments a DB file, to obtain local subfiles of the DB file, obtains a first local subfile from the local subfiles, and uploads the first local subfile to a server, where the first local subfile is a local subfile that does not have a corresponding server side subfile in the server; and/or obtains a second local subfile from the local subfiles, and uploads the second local subfile to the server, where the second local subfile is a local subfile that has a corresponding server side subfile in the server and that corresponds to a content comparison result indicating that the second local
(Continued)

subfile and the corresponding server side subfile are inconsistent. In this case, a local subfile whose content does not change is not uploaded each time.

20 Claims, 11 Drawing Sheets

(51) Int. Cl.
*H04L 67/06* (2022.01)
*H04L 67/1097* (2022.01)
(52) U.S. Cl.
CPC .......... *G06F 11/1469* (2013.01); *H04L 67/06* (2013.01); *H04L 67/1097* (2013.01)
(58) Field of Classification Search
CPC ............. G06F 11/1469; G06F 11/1448; G06F 2201/80; G06F 11/14; G06F 11/1453
See application file for complete search history.

(56) References Cited

U.S. PATENT DOCUMENTS

| | | | |
|---|---|---|---|
| 8,214,376 B1 | 7/2012 | Jordan et al. | |
| 9,740,422 B1* | 8/2017 | Ozdemir | G06F 11/1453 |
| 10,592,527 B1* | 3/2020 | Jia | G06F 16/27 |
| 2003/0204613 A1* | 10/2003 | Hudson | H04L 67/10 709/231 |
| 2006/0224639 A1 | 10/2006 | Watanabe et al. | |
| 2010/0070476 A1* | 3/2010 | O'Keefe | G06F 11/1458 718/1 |
| 2011/0282839 A1* | 11/2011 | Paksoy | G06F 16/2272 707/E17.007 |
| 2014/0317063 A1* | 10/2014 | Patterson | G06F 16/1748 707/685 |
| 2015/0067104 A1* | 3/2015 | Curry | H04L 63/0209 709/218 |
| 2015/0309882 A1 | 10/2015 | Harrison et al. | |
| 2017/0006314 A1* | 1/2017 | Danovitz | H04L 65/762 |
| 2017/0134532 A1* | 5/2017 | Bøgelund | H04L 67/56 |
| 2017/0220820 A1 | 8/2017 | Young | |
| 2018/0189145 A1* | 7/2018 | Borate | G06F 3/0619 |
| 2019/0213087 A1 | 7/2019 | Kumarasamy et al. | |
| 2021/0120307 A1* | 4/2021 | Bastable | H04N 21/4408 |
| 2021/0255935 A1* | 8/2021 | Dornemann | G06F 3/0619 |
| 2022/0283997 A1* | 9/2022 | Gunda | G06F 11/1453 |
| 2024/0106890 A1* | 3/2024 | Jiang | H04L 67/108 |

FOREIGN PATENT DOCUMENTS

| | | |
|---|---|---|
| CN | 106294585 A | 1/2017 |
| CN | 106874399 A | 6/2017 |
| CN | 107332918 A | 11/2017 |
| CN | 109101365 A | 12/2018 |
| CN | 109271461 A | 1/2019 |

* cited by examiner

DATABASE FILE BACKUP METHOD AND APPARATUS, AND ELECTRONIC DEVICE

CROSS-REFERENCE TO RELATED APPLICATIONS

This application is a national stage of International Application No. PCT/CN2021/080093, filed Mar. 11, 2021, which claims priority to Chinese Patent Application No. 202010218981.2, filed Mar. 25, 2020. Both of the aforementioned applications are hereby incorporated by reference in their entireties.

TECHNICAL FIELD

This application relates to the field of intelligent terminal technologies, and in particular, to a database (DB) file backup method and apparatus, and an electronic device.

BACKGROUND

To make an overall cloud backup, system data and application data on an electronic device of a user need to be backed up in the cloud, so that after the user replaces the device or the device is restored to a factory setting, the user can restore, on the electronic device to a maximum extent, data previously generated when the electronic device is used. Backup performance is a very important point in a cloud backup solution.

A file type in the application data includes a txt file, a photo file, a music file, a video file, a DB file, or the like. For a file that does not change frequently, for example, a photo file, a music file, or a video file, in a cloud backup method in the conventional technology, an amount of data that is subsequently backed up again can be effectively reduced. However, for a DB file that stores data in a database, there is almost no performance gain in the cloud backup method in the conventional technology, and each time a backup is made again, the DB file needs to be backed up, and a long backup time period is required.

SUMMARY

This application provides a DB file backup method and apparatus, and an electronic device, to optimize DB file backup performance.

According to a first aspect, an embodiment of this application provides a DB file backup method, including:

An electronic device segments a DB file, to obtain a local subfile of the DB file, where the DB file includes a plurality of file blocks, each local subfile includes at least one file block, and the file block is a storage unit of the DB file;

the electronic device obtains a first local subfile from the local subfile, and uploads the first local subfile to a server, where the first local subfile is a local subfile that does not have a corresponding server side subfile in the server; and/or the electronic device obtains a second local subfile from the local subfile, and uploads the second local subfile to the server, where the second local subfile is a local subfile that has a corresponding server side subfile in the server and that corresponds to a content comparison result indicating that the second local subfile and the corresponding server side subfile are inconsistent.

The local subfile and a corresponding server side subfile occupy a same file block.

The electronic device may include a device such as a mobile terminal (mobile phone), a computer, a PAD, a wearable device, a smart screen, a drone, an intelligent connected vehicle (ICV), an intelligent vehicle (car) (smart/intelligent car), or a vehicle-mounted device.

In the method, only the first local subfile that does not have a corresponding server side subfile in the server and/or the second local subfile whose content changes are/is uploaded each time, and a local subfile whose content does not change is not uploaded. Compared with the conventional technology in which the entire DB file is uploaded, in the method, an amount of data that is uploaded from the DB file is reduced, and DB file backup performance is optimized.

Before the electronic device obtains the first local subfile and/or the second local subfile from the local subfile, the method further includes:

The electronic device generates a local file list based on the local subfile, and obtains a server side file list of the DB file.

That the electronic device obtains a first local subfile and/or a second local subfile from the local subfile includes:

The electronic device obtains the first local subfile and/or the second local subfile from the local subfile based on the local file list and the server side file list.

In the method, the first local subfile and the second local subfile are obtained based on the local file list and the server side file list.

The local file list includes a file ID of the local subfile, and the server side file list includes a file ID of the server side subfile.

That the electronic device obtains the first local subfile from the local subfile based on the local file list and the server side file list includes:

The electronic device obtains, from the local subfile, a local subfile whose file ID exists only in the local file list, and uses the local subfile as the first local subfile.

Therefore, the first local subfile is obtained from the local subfile.

The local file list includes a file ID and a file fingerprint of the local subfile, and the server side file list includes a file ID and a file fingerprint of the server side subfile.

That the electronic device obtains the second local subfile from the local subfile based on the local file list and the server side file list includes:

The electronic device obtains a local subfile whose file ID exists in both the local file list and the server side file list and whose file fingerprints corresponding to the file ID are inconsistent, and uses the local subfile as the second local subfile.

Therefore, the second local subfile is obtained from the local subfile.

The server side file list is stored in the electronic device, and after the electronic device uploads the first local subfile and/or the second local subfile to the server, the method further includes:

The electronic device updates, based on the local file list, the server side file list stored in the electronic device.

The server side file list is stored in the electronic device, to reduce data exchange between the electronic device and the server, and improve DB file backup efficiency.

Before the electronic device segments the DB file, to obtain the local subfile of the DB file, the method further includes:

The electronic device obtains the server side file list of the DB file, where the server side file list includes a file block ID of a file block occupied by a server side subfile of the DB file.

That an electronic device segments a DB file, to obtain a local subfile of the DB file includes:

The electronic device determines whether a file block other than a first file block exists in the DB file, where the first file block is a file block corresponding to the file block ID included in the server side file list; and if a file block other than the first file block exists, the electronic device classifies the file block other than the first file block according to a preset rule, and classifies the first file block based on the server side file list; or if no file block other than the first file block exists, the electronic device segments the DB file based on the server side file list.

Therefore, classification of a file block whose file block ID is recorded in the server side file list of the DB file based on the server side file list.

According to a second aspect, an embodiment of this application provides an electronic device, including:

one or more processors, a memory, and one or more computer programs, where the one or more computer programs are stored in the memory, the one or more computer programs include instructions, and when the instructions are executed by the device, the device is enabled to perform the following steps:

segmenting a DB file, to obtain a local subfile of the DB file, where the DB file includes a plurality of file blocks, each local subfile includes at least one file block, and the file block is a storage unit of the DB file;

obtaining a first local subfile from the local subfile, and uploading the first local subfile to a server, where the first local subfile is a local subfile that does not have a corresponding server side subfile in the server; and/or obtaining a second local subfile from the local subfile, and uploading the second local subfile to the server, where the second local subfile is a local subfile that has a corresponding server side subfile in the server and that corresponds to a content comparison result indicating that the second local subfile and the corresponding server side subfile are inconsistent.

The local subfile and a corresponding server side subfile occupy a same file block.

When the instructions are executed by the device, before the device is enabled to obtain the first local subfile and/or the second local subfile from the local subfile, the device further performs the following step:

generating a local file list based on the local subfile, and obtaining a server side file list of the DB file.

That the device is enabled to perform the step of obtaining a first local subfile and/or a second local subfile from the local subfile includes:

obtaining the first local subfile and/or the second local subfile from the local subfile based on the local file list and the server side file list.

The local file list includes a file ID of the local subfile, and the server side file list includes a file ID of the server side subfile.

When the instructions are executed by the device, that the device is enabled to perform the step of obtaining the first local subfile from the local subfile based on the local file list and the server side file list includes:

obtaining, from the local subfile, a local subfile whose file ID exists only in the local file list, and using the local subfile as the first local subfile.

The local file list includes a file ID and a file fingerprint of the local subfile, and the server side file list includes a file ID and a file fingerprint of the server side subfile.

When the instructions are executed by the device, that the device is enabled to perform the step of obtaining the second local subfile from the local subfile based on the local file list and the server side file list includes:

obtaining a local subfile whose file ID exists in both the local file list and the server side file list and whose file fingerprints corresponding to the file ID are inconsistent, and using the local subfile as the second local subfile.

The server side file list is stored in the electronic device, and when the instructions are executed by the device, after the electronic device is enabled to perform the step of uploading the first local subfile and/or the second local subfile to the server, the device further performs the following step:

updating, based on the local file list, the server side file list stored in the electronic device.

When the instructions are executed by the device, before the device is enabled to perform the step of segmenting a DB file, to obtain a local subfile of the DB file, the device further performs the following step:

obtaining the server side file list of the DB file, where the server side file list includes a file block ID of a file block occupied by a server side subfile of the DB file.

Correspondingly, that the device is enabled to perform the step of segmenting a DB file, to obtain a local subfile of the DB file includes:

determining whether a file block other than a first file block exists in the DB file, where the first file block is a file block corresponding to the file block ID included in the server side file list; and if a file block other than the first file block exists, classifying the file block other than the first file block according to a preset rule, and classifying the first file block based on the server side file list; or if no file block other than the first file block exists, segmenting the DB file based on the server side file list.

According to a third aspect, an embodiment of this application provides a database DB file backup system, including an electronic device and a server.

The electronic device is configured to perform the method in the first aspect.

The server is configured to store a server side subfile of a DB file.

According to a fourth aspect, an embodiment of this application provides a computer-readable storage medium. The computer-readable storage medium stores a computer program, and when the computer program is run on a computer, the computer is enabled to perform the method in the first aspect.

According to a fifth aspect, this application provides a computer program. When the computer program is executed by a computer, the computer is configured to perform the method in the first aspect.

In a possible design, the program in the fifth aspect may be all or partially stored in a storage medium that is packaged with a processor, or may be partially or all stored in a memory that is not packaged with a processor.

BRIEF DESCRIPTION OF DRAWINGS

To describe the technical solutions in embodiments of the present disclosure more clearly, the following briefly describes the accompanying drawings for describing embodiments. It is clear that the accompanying drawings in the following descriptions show merely some embodiments of the present disclosure, and a person of ordinary skill in the art may derive other drawings from these accompanying drawings without creative efforts.

DETAILED DESCRIPTION

Figure 1:
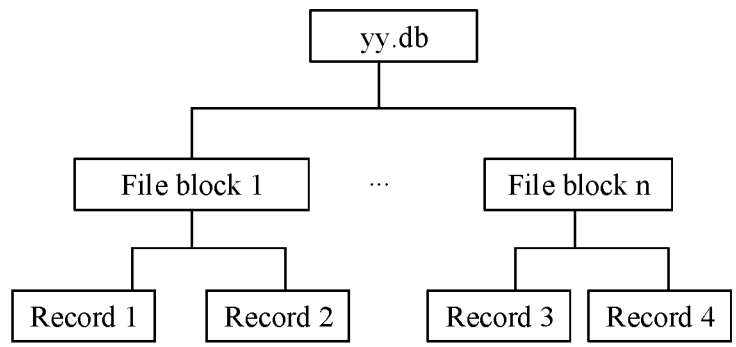
FIG. 1 is an exemplary diagram of a structure of a B+ tree of a database system in the conventional technology.

Terms used in embodiments of this application are only used to explain exemplary embodiments of this application, but are not intended to limit this application.

In the conventional technology, a file type in application data includes a txt file, a photo file, a music file, a video file, a DB file, or the like. The DB file is a special type of file. Special features of the DB file are mainly represented as follows:

First, there is high utilization. Data of almost all applications needs to be stored. The DB file is first selected to store structured data. In other words, DB files of almost all the applications need to be backed up during a backup.

Second, the DB file frequently changes. Different from a file such as a photo or a video that is not modified once generated, a DB file of an application changes provided that data of the application is added, deleted, or modified. An application WeChat is used as an example. The DB file is used to store a chatting record and a trend in Moments of WeChat. The DB file changes provided that a new message is received or sent or there is a trend in Moments. In other words, the DB file usually needs to be re-uploaded during a backup of application data.

Third, DB files of some super applications have a large size. The application WeChat is used as an example. The DB file is usually more than 1G. Consequently, a long time period needs to be taken when the DB file is uploaded.

In the conventional technology, uploading is performed in a unit of file. After being successfully uploaded for a first time, a file such as a photo or a video that does not frequently change does not need to be re-uploaded during a subsequent backup. Therefore, a backup method in the conventional technology is effective for the file such as the photo or the video that does not frequently change. However, after a DB file that frequently changes is successfully uploaded for a first time, the DB file still needs to be re-uploaded if the DB file changes during a subsequent backup. Therefore, in the conventional technology, there is almost no performance gain for a backup of the DB file that frequently changes. The application WeChat is used as an example. During the backup of the application data, information such as the chatting record of WeChat is stored in the DB file. The DB file usually changes. In addition, the DB file becomes larger as a user uses the application for a longer time period. Therefore, each time a backup is made again, the DB file needs to be backed up, and a long backup time period is required.

Therefore, the DB file that frequently changes is usually a key problem limiting backup performance.

Therefore, embodiments of this application provide a DB file backup method and apparatus, and an electronic device, to optimize DB file backup performance.

It should be noted that, the DB file backup method in embodiments of this application is applicable to a backup of a DB file, for example, a cloud backup of the DB file, or a cloud backup of the DB file in an overall cloud backup.

To better understand the technical solutions in embodiments of this application, terms appearing in embodiments of this application are first explained by way of illustration but not limitation.

A DB file is a file used by an application on an electronic device to store data in a database, and is usually used to store structured data, to implement efficient data management, retrieval, or the like.

SQLite is a lightweight database system, is currently applied to many embedded products, is also widely applied to an Android platform, and is a mainstream database used by the application on the electronic device.

Cloud backup: The cloud backup is to store backup data of an electronic device of a user by using a cloud storage capability, to avoid a case in which backup data of a local backup of the electronic device may be damaged or lost due to damage to a disk or a loss of the device.

A file fingerprint is a feature value that is strongly related to file content and that is generated for a file based on an algorithm. The file fingerprint correspondingly changes when the file content changes. The file and another file may be distinguished based on the file fingerprint. The algorithm may include but is not limited to hash-based message authentication code (HMAC), message-digest algorithm (MD5), a hash algorithm, or the like. For example, the file fingerprint that is of a file and that is obtained through calculation for the file based on a hash algorithm may be referred to as a hash value of the file, and the file and another file may be distinguished based on the hash value.

The following describes a storage principle of a DB file.

From a perspective of an upper layer, a database manages data in a dimension such as a table or a record. For an application that uses the database, a database manipulation language such as structured query language (SQL) may be used to quickly and conveniently search for and operate a specified record.

However, from a perspective of a bottom-layer implementation of the database, data in the database is still stored in a file, and the file that stores the data in the database is referred to as a DB file. The DB file includes a file block. A record in the database is stored in the file block. The file block is a basic unit of storage in the database. Usually, one file block may store many records. Specifically, the DB file may include several file blocks. When a storage capacity of the file block included in the DB file is insufficient, a file block may be newly added to the DB file at the end of the file block included in the DB file. An operation such as deletion or modification performed on the record in the database is an operation performed on the record in the file block, and does not cause deletion of the file block.

A database system usually establishes an index of the file block in a form of a B+ tree that is convenient for a quick query, to quickly locate, based on a specific condition, a file block in which a record is located, and then perform a specific read/write operation on data in the file block. For example, the B+ tree is shown in FIG. 1. For a DB file whose file name is yy.db, and a record or a table that is of the database and that is stored in the file block is recorded under an ID of each file block.

A database system SQLite is used as an example. SQLite is a mainstream database used by an application on an electronic device. Data stored in SQLite is also stored in a DB file. For example, for a super application such as WeChat or Weibo, structured data of the application is stored by using SQLite. A bottom-layer storage structure of SQLite is analyzed, and it is found that SQLite is the same as most relational databases, and at a bottom layer, a record is stored by using a file block, and is managed by using the B+ tree. The DB file that stores the data in SQLite is used as an example below, to describe a storage principle of the DB file.

The file block in SQLite is referred to as a page. In SQLite, two bytes starting from an offset location 16 of a DB file header are used to mark a page size of a current DB file. Table 1 shows a DB file format on an SQLite official website. After the database is successfully initialized, records are organized and stored based on the page size. The page size may be set by an application using SQLite, and the page size is 2 to the power of n between 512 and 65536.

TABLE 1

| Offset | Size | Description |
| --- | --- | --- |
| 0 | 16 | Header string: "SQLite format 3\000" |
| 16 | 2 | A page size of a database is in a unit of a byte. The size is 2 to the power of n between 512 and 65536. |

Figure 2:
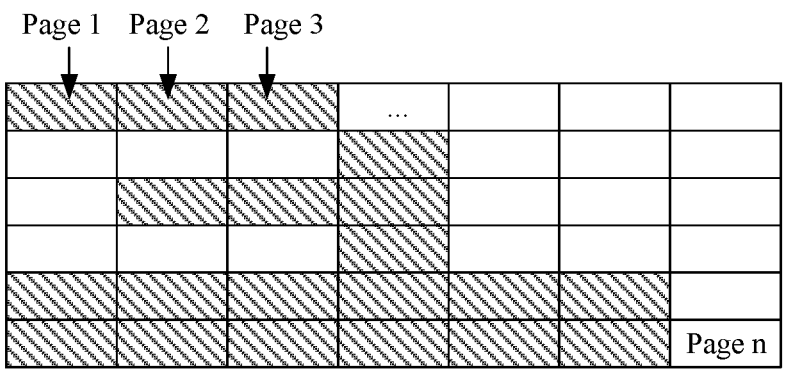
FIG. 2 is an exemplary diagram of storage of a DB file in the conventional technology.

FIG. 2 is a schematic diagram of storage of a DB file in SQLite. Herein, n pages are allocated to the DB file, n is a natural number, and one grid represents one page. A page filled with oblique lines indicates that the page is filled with a value, in other words, the page stores data. A page filled with no oblique line indicates that the page is filled with no value, in other words, the page stores no data. In SQLite, the page filled with no value is referred to as a free page. The free page may not be filled with a value once after being allocated to the DB file, or the free page may be originally filled with a value, and the filled value is deleted in a change process of the DB file.

Figure 3:
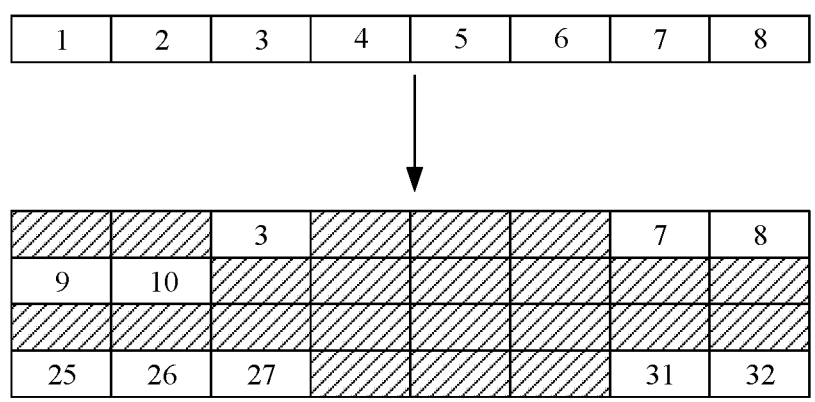
FIG. 3 is an exemplary diagram of a storage change process of a DB file in the conventional technology.

FIG. 3 is a schematic diagram of a storage change process of a DB file in SQLite.

In an initial state, an electronic device allocates several pages to the DB file, and manages, by using a free page linked list, all pages filled with no value. A quantity of pages initially allocated by the electronic device to each DB file is not fixed. In other words, the quantity of pages specifically and initially allocated to the DB file may be set based on an actual application situation. This is not limited in this embodiment of this application. As shown in FIG. 3, that eight pages are initially allocated to the DB file is used as an example. All pages initially allocated to the DB file are filled with no value, and the free page linked list is 1-2-3-4-5-6-7-8.

After the DB file starts to be used, a quantity of pages included in the DB file may be the same as or more than the quantity of initially allocated pages. To be specific, when a database starts to be created, the electronic device allocates a specified quantity of pages to the DB file, for example, eight pages shown in FIG. 3. After the database starts to be used, if a storage capacity of the DB file meets a storage requirement of the database, the electronic device may not allocate a new page to the DB file, and only the initially allocated page is used for the DB file. In this case, the quantity of pages included in the DB file is the same as the quantity of initially allocated pages. Alternatively, as the database is used, more data needs to be stored in the DB file, the initially allocated page cannot meet a storage requirement of the DB file, and the electronic device may continue to allocate a new page to the DB file, so that the quantity of pages included in the DB file increases. For example, as shown in FIG. 3, the quantity of pages included in the DB file gradually increases from 8 to 32. When the electronic device allocates a new page to the DB file, a new page is usually added at the end of the page included in the DB file. For example, as shown in FIG. 3, the DB file initially includes eight pages, and the eight pages are respectively a page 1 to a page 8. Then, if a new page is allocated to the DB file, for example, if four new pages are allocated, four new pages, namely, a page 9 to a page 12 shown in FIG. 3 are added after a last page, namely, the page 8. Subsequently, if another new page is allocated to the DB file, for example, 10 new pages are allocated, 10 new pages, namely, a page 13 to a page 22 shown in FIG. 3 are added after a last page, namely, the page 12, and so on. Details are not described again.

In a use process of the database, when data needs to fill the DB file, one page is selected from the free page linked list, and a record fills the page. If a page is released subsequently when a record is deleted, the page is added to the free page linked list again. For example, as shown in FIG. 3, after the database is used for a period of time, the free page linked list may change to 3-7-8-9-10-25-26-27-31-32.

In conclusion, when the storage capacity of the DB file is sufficient and the electronic device does not need to allocate a new page to the DB file, each time an operation such as addition, deletion, or modification is performed on a record in the database, so that content in the DB file changes, only content stored in one or more pages included in the DB file changes actually, and the quantity of pages included in the DB file does not change.

The foregoing describes the storage principle of the DB file.

The following describes embodiments of this application.

Figure 4:
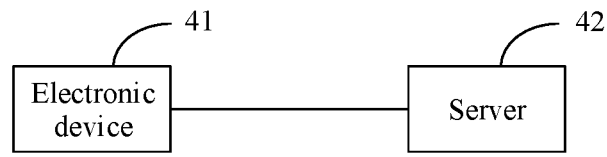
FIG. 4 is a diagram of a structure in an embodiment of a DB file backup system according to this application.

FIG. 4 is an example diagram of a system architecture to which a DB file backup method is applicable according to an embodiment of this application. The system architecture includes an electronic device 41 and a server 42.

The electronic device 41 may include a device such as a mobile terminal (mobile phone), a computer, a personal access device (PAD), a wearable device, a smart screen, a drone, an intelligent connected vehicle (ICV), an intelligent vehicle (car) (smart/intelligent car), or a vehicle-mounted device.

The server 42 may be one server, or a server cluster including a plurality of servers. This is not limited in this application. Preferably, the server 42 may be a cloud server.

The electronic device 41 and the server 42 may be connected through a network, and the network may be a wired network or a wireless network.

The following provides an example description of the DB file backup method in this embodiment of this application by using a cloud backup of the electronic device as an example. In this case, the server in the following description may be a cloud server.

Usually, the electronic device 41 starts a cloud backup of a DB file. Specifically, an occasion on which the electronic device starts the cloud backup of the DB file may include but is not limited to the following two cases:

Case 1: The electronic device 41 starts an overall cloud backup, and correspondingly, the electronic device 41 starts the cloud backup of the DB file.

Case 2: The electronic device 41 receives a cloud backup instruction for the DB file, and correspondingly, the electronic device 41 starts the cloud backup of the DB file. A user may send the instruction by performing an operation, and the operation may include but is not limited to clicking a button of starting the cloud backup of the DB file, setting timing of starting the cloud backup of the DB file, or the like. Alternatively, an application to which the DB file belongs may send, according to a preset rule in the application, an instruction for the cloud backup of the DB file, or the like. This is not limited in this application.

In this embodiment of this application, when making a cloud backup of the DB file for a first time, the electronic device 41 segments the DB file into subfiles. The subfile is referred to as a local subfile in this embodiment of this application. The local subfile is uploaded to the server 42. The server 42 stores a received local subfile. The local subfile stored in the server 42 becomes a cloud subfile of the DB file. Then, when making cloud backup of the DB file again, the electronic device 41 still segments the DB file into local subfiles. For a local subfile that does not have a corresponding cloud subfile, the electronic device 41 directly uploads the local subfile to the server 42. For a local subfile that has a corresponding cloud subfile, the electronic device 41 makes a content comparison between the local subfile and the corresponding cloud subfile in the server 42. If a comparison result is that the local subfile and the corresponding cloud subfile are consistent, it indicates that content of the local subfile does not change, and the electronic device 41 does not upload the local subfile. If a comparison result is that the local subfile and the corresponding cloud subfile are inconsistent, it indicates that content of the local subfile changes, and the electronic device 41 uploads the local subfile to the server 42, and updates the corresponding cloud subfile in the server 42.

Through the foregoing processing, the electronic device 41 implements the cloud backup of the DB file. In addition, the electronic device 41 uploads only a local subfile that does not have a corresponding cloud subfile and/or a local subfile whose content changes, and does not need to upload a local subfile whose content does not change. Compared with the conventional technology in which the entire DB file is uploaded, in this embodiment, an amount of data that is uploaded when the cloud backup of the DB file is made is reduced, a cloud backup time period of the DB file is further reduced, and cloud backup performance of the DB file is improved.

The electronic device 41 segments the DB file based on a file block occupied by a DB file in a storage principle of the DB file. The file block is a basic unit of storage in the DB file.

Each local subfile includes at least one file block, and a quantity of file blocks included in each local subfile is not limited in this application.

The following describes a possible implementation in which the electronic device segments the DB file.

Different local subfiles may have a same size or different sizes, which is related to a segmentation rule of the DB file. Details are as follows.

Figure 5A:
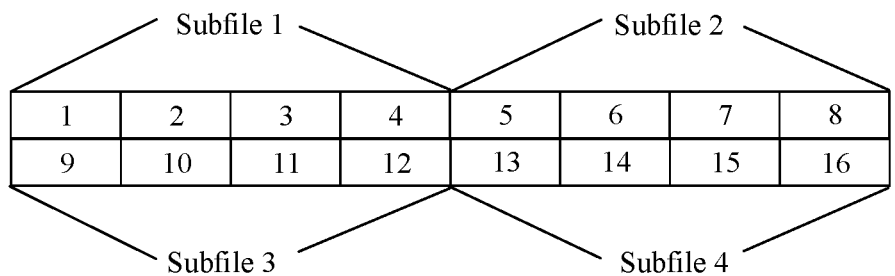
FIG. 5a to FIG. 5d are exemplary diagrams of a DB file segmentation method according to an embodiment of this application.
Figure 5B:
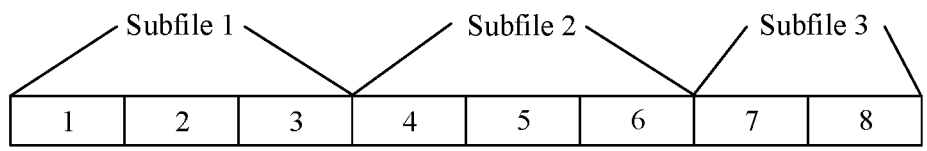

In a possible implementation, the DB file may be equally segmented into several local subfiles based on an integer multiple of a quantity of file blocks. For example, it is assumed that the electronic device 41 presets that each local subfile includes n file blocks, where n is a natural number. Correspondingly, the DB file may be segmented into several local subfiles whose sizes each are n file blocks. As shown in FIG. 5a, if a value of n is 4, and the DB file includes 16 file blocks, the DB file may be segmented into four local subfiles of an equal size. It should be noted that, in this embodiment of this application, equal segmentation may be approximately equal segmentation. For example, if a total quantity of file blocks included in the DB file cannot be exactly divided by n, a quantity of file blocks included in a last local subfile may be less than n. For example, as shown in FIG. 5b, if n is 3, in other words, the DB file is segmented into local subfiles whose sizes each are three file blocks, and the DB file includes eight file blocks, the DB file is finally segmented into three local subfiles, a $1^{st}$ local subfile and a $2^{nd}$ local subfile each include three file blocks, and a $3^{rd}$ local subfile includes two file blocks.

Figure 5C:
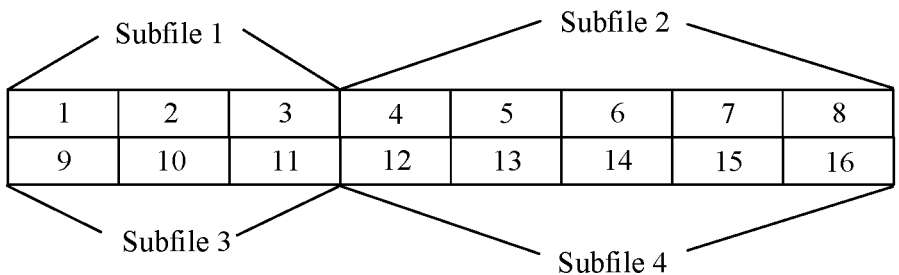
Figure 5D:
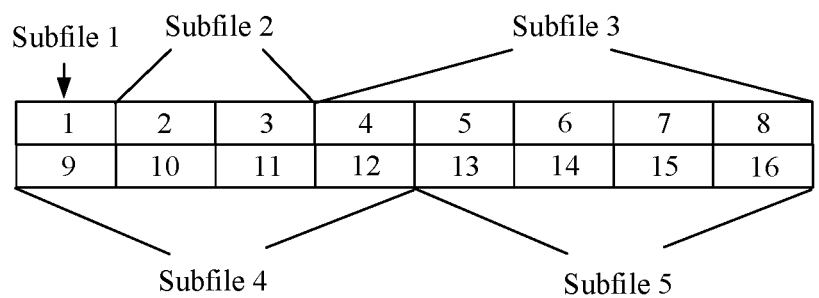

In another possible implementation, the DB file may be segmented into several local subfiles whose sizes are not the same or are not completely the same. This segmentation rule may indicate definite regularity or may indicate disorder. For example, it is assumed that the DB file includes 16 file blocks. Referring to FIG. 5c, the DB file may be segmented into four local subfiles. A $1^{st}$ local subfile includes three file blocks, a $2^{nd}$ local subfile includes five file blocks, a $3^{rd}$ local subfile includes three file blocks, and a $4^{th}$ local subfile includes five file blocks. It can be learned that in this segmentation rule, regularity is that 3 and 5 sequentially and cyclically occur, and this segmentation rule is a segmentation rule indicating definite regularity. Referring to FIG. 5d, the DB file may be segmented into five local subfiles. A $1^{st}$ local subfile includes one file block, a $2^{nd}$ local subfile includes two file blocks, a $3^{rd}$ local subfile includes five file blocks, a $4^{th}$ local subfile includes four file blocks, and a $5^{th}$ local subfile includes four file blocks. This is a segmentation rule indicating no regularity.

It should be noted that it is easier to implement equal segmentation of the DB file. However, even if the DB file is not segmented based on an equal segmentation principle, a requirement in this embodiment of this application is met, and file backup performance is optimized in this embodiment of this application. In an actual application, a specific segmentation rule for segmenting the DB file is not limited in this application, provided that a same file block is obtained by segmenting the DB file based on a same segmentation rule each time a cloud backup of a same DB file is made, to ensure that a same file block still belongs to a same subfile. For example, file blocks 1 to 16 of the DB file are classified in a manner shown in FIG. 5d for a first time, and then the file blocks 1 to 16 of the DB file are still classified in the manner shown in FIG. 5d each time, to ensure that the file block 1 is always in one local subfile, file blocks 2 to 3 are always in one local subfile, and so on, so that a content comparison between a local subfile and a corresponding cloud subfile can be made.

It should be noted that, a newly added file block of the DB file may be classified according to a segmentation rule the same as that of an original file block of the DB file, or may be classified according to a segmentation rule different from that of an original file block of the DB file, and a newly added file block also needs to be classified according to a same segmentation rule each time a cloud backup is made. For example, it is assumed that the DB file initially includes eight file blocks, namely, file blocks 1 to 8, and the eight file blocks are classified into two subfiles based on a case in which each subfile includes four file blocks. Then, 24 file blocks, namely, file blocks 9 to 32 are newly added to the DB file, and the file blocks 9 to 32 may be classified into six subfiles according to a segmentation rule in which each subfile includes 4 file blocks and that is the same as that of the file blocks 1 to 8, or may be classified according to another segmentation rule, for example, may be classified into four subfiles according to a segmentation rule in which each subfile includes six file blocks. However, for the file blocks 9 to 32, a same segmentation rule is preferably used each time a cloud backup of the file blocks 9 to 32 is made, to ensure that a same file block belongs to a same subfile each time a cloud backup is made. For example, it is assumed that when the file blocks 9 to 32 are classified for a first time, the file blocks 9 to 32 are classified according to the segmentation rule in which each subfile includes six file blocks. Therefore, when a cloud backup is made subsequently, and the file blocks 9 to 32 are classified again, the file blocks 9 to 32 are preferably still classified according to the segmentation rule in which each subfile includes six file blocks.

In this embodiment of this application, when segmenting the DB file, the electronic device 41 segments the DB file based on the file block included in the DB file in the storage principle of the DB file. Specifically, each local subfile obtained by segmenting the DB file includes an integral quantity of file blocks. Through segmentation, each local subfile includes an integer multiple of a plurality of complete file blocks without damage to a data structure and coherence of the file block in the DB file.

Because of a characteristic that the DB file stores a record and a table in the database based on a file block, an operation such as addition, deletion, or modification performed on a record in the DB file is an operation performed on data in a file block storing the record. Data in a file block in the DB file does not change due to modification performed on another file block. In other words, modification performed on one file block does not affect adaptive modification performed on another file block. Therefore, a change in the record in the database is usually represented as a change in content of the file block storing the record in the DB file. Content of another file block remains unchanged. Based on the foregoing principle, the DB file is segmented into subfiles, and when a cloud backup is made based on the subfiles, only a subfile including a newly added file block and/or a subfile including a file block whose content changes is backed up. Compared with the conventional technology in which the entire DB file is uploaded, in this embodiment, an amount of data that is uploaded when a cloud backup of the DB file is made can be effectively reduced, a cloud backup time period of the DB file is further reduced, and cloud backup performance of the DB file is improved.

In addition, because of the characteristic that the DB file stores the record and the table in the database based on the file block, when the DB file is segmented into subfiles, and a cloud backup is made based on only the subfile, a problem that data of the subfile and data of adjacent subfiles are inconsecutive due to a backup of a subfile is not caused. When the electronic device re-obtains the cloud subfile of the DB file from the server, the electronic device may directly and sequentially concatenate cloud subfiles, to obtain the complete DB file.

Figure 6:
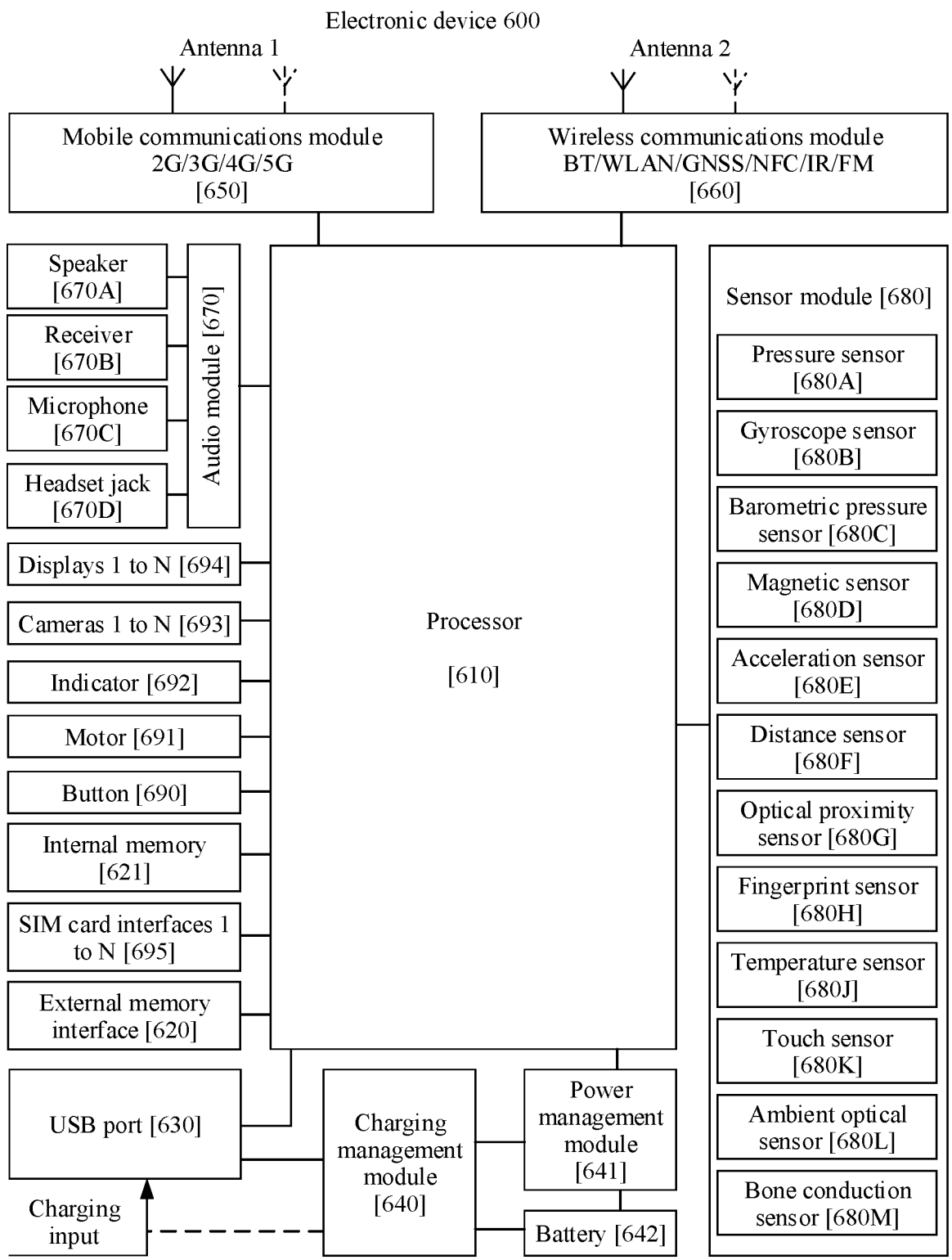
FIG. 6 is a diagram of a structure in an embodiment of an electronic device according to this application.

FIG. 6 is a possible diagram of a structure of an electronic device according to an embodiment of this application. An electronic device 600 includes a processor 610, an internal memory 621, an antenna 1, an antenna 2, a mobile communications module 650, and a wireless communications module 660. Optionally, the electronic device 600 may further include an external memory interface 620, a universal serial bus (USB) port 630, a charging management module 640, a power management unit 641, a battery 642, an audio module 670, a speaker 670A, a receiver 670B, a microphone 670C, a headset jack 670D, a sensor module 680, a button 690, a motor 691, an indicator 692, a camera 693, a display 694, a subscriber identity module (SIM) card interface 695, or the like. The sensor module 680 may include a pressure sensor 680A, a gyro sensor 680B, a barometric pressure sensor 680C, a magnetic sensor 680D, an acceleration sensor 680E, a distance sensor 680F, an optical proximity sensor 680G, a fingerprint sensor 680H, a temperature sensor 680J, a touch sensor 680K, an ambient light sensor 680L, a bone conduction sensor 680M, or the like.

It may be understood that the structure shown in this embodiment of the present disclosure does not constitute a specific limitation on the electronic device 600. In some other embodiments of this application, the electronic device 600 may include more or fewer components than those shown in the figure, or some components may be combined, or some components may be split, or different component arrangements may be used. The components shown in the figure may be implemented by hardware, software, or a combination of software and hardware.

The processor 610 may include one or more processing units. For example, the processor 610 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors.

The controller may generate operation control signal based on instruction operation code and a time sequence signal, to complete control of instruction reading and instruction execution.

A memory may be further disposed in the processor 610, and is configured to store instructions and data. In some embodiments, the memory in the processor 610 is a cache memory. The memory may store an instruction or data that has just been used or cyclically used by the processor 610. If the processor 610 needs to use the instruction or the data again, the processor may directly invoke the instruction or the data from the memory. This avoids repeated access, reduces waiting time of the processor 610, and improves system efficiency.

In some embodiments, the processor 610 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a bidirectional synchronous serial bus, including a serial data line (SDL) and a serial clock line (SCL). In some embodiments, the processor 610 may include a plurality of groups of I2C buses. The processor 610 may be separately coupled to the touch sensor 680K, a charger, a flash, the camera 693, and the like through different I2C bus interfaces. For example, the processor 610 may be coupled to the touch sensor 680K through the I2C interface, so that the processor 610 communicates with the touch sensor 680K through the I2C bus interface, to implement a touch function of the electronic device 600.

The I2S interface may be configured to perform audio communication. In some embodiments, the processor 610 may include a plurality of groups of I2S buses. The processor 610 may be coupled to the audio module 670 through the I2S bus, to implement communication between the processor 610 and the audio module 670. In some embodiments, the audio module 670 may transmit an audio signal to the wireless communications module 660 through the I2S interface, to implement a function of answering a call through a Bluetooth headset.

The PCM interface may also be configured to perform audio communication, to sample, quantize, and encode an analog signal. In some embodiments, the audio module 670 may be coupled to the wireless communications module 660 through a PCM bus interface. In some embodiments, the audio module 670 may alternatively transmit an audio signal to the wireless communications module 660 through the PCM interface, to implement a function of answering a call through a Bluetooth headset. Both the I2S interface and the PCM interface may be used for audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 610 and the wireless communications module 660. For example, the processor 610 communicates with a Bluetooth module in the wireless communications module 660 through the UART interface, to implement a Bluetooth function. In some embodiments, the audio module 670 may transmit an audio signal to the wireless communications module 660 through the UART interface, to implement a function of playing music through a Bluetooth headset.

The MIPI interface may be configured to connect the processor 610 and a peripheral component such as the display 694 and the camera 693. The MIPI interface includes a camera serial interface (CSI), a display serial interface (DSI), or the like. In some embodiments, the processor 610 communicates with the camera 693 through the CSI interface, to implement an imaging shooting function of the electronic device 600. The processor 610 communicates with the display 694 through the DSI interface, to implement a display function of the electronic device 600.

The GPIO interface may be configured by software. The GPIO interface may be configured as a control signal or a data signal. In some embodiments, the GPIO interface may be configured to connect the processor 610 and the camera 693, the display 694, the wireless communications module 660, the audio module 670, the sensor module 680, or the like. The GPIO interface may alternatively be configured as an I2C interface, an I2S interface, a UART interface, an MIPI interface, or the like.

The USB port 630 is a port that conforms to a USB standard specification, and may be specifically a mini USB port, a micro USB port, a USB type-C port, or the like. The USB port 630 may be configured to be connected to a charger to charge the electronic device 600, or may be configured to transmit data between the electronic device 600 and a peripheral device, or may be configured to connect to a headset for playing audio through the headset. The port may be further configured to connect to another electronic device such as an augmented reality (AR) device.

It may be understood that an interface connection relationship between the modules that is shown in embodiments of the present disclosure is merely an example for descriptions, and does not constitute a limitation on the structure of the electronic device 600. In some other embodiments of this application, different interface connection manners in the foregoing embodiments or a combination of a plurality of interface connection manners may alternatively be used for the electronic device 600.

A wireless communications function of the electronic device 600 may be implemented by using the antenna 1, the antenna 2, the mobile communications module 650, the wireless communications module 660, the modem processor, the baseband processor, or the like.

The antenna 1 and the antenna 2 are configured to transmit and receive electromagnetic wave signals. Each antenna in the electronic device 600 may be configured to cover one or more communications frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 650 may provide a solution to wireless communication including 2G/3G/4G/5G applied to the electronic device 600. The mobile communications module 650 may include at least one filter, a switch, a power amplifier, a low noise amplifier (LNA), and the like. The mobile communications module 650 may receive an electromagnetic wave through the antenna 1, perform processing such as filtering or amplification on the received electromagnetic wave, and transmit the electromagnetic wave to the modem processor for demodulation. The mobile communications module 650 may further amplify a signal modulated by the modem processor, and convert the signal into an electromagnetic wave for radiation through the antenna 1. In some embodiments, at least some functional modules in the mobile communications module 650 may be disposed in the processor 610. In some embodiments, the at least some functional modules in the mobile communications module 650 and at least some functional modules in the processor 610 may be disposed in a same device.

The modem processor may include a modulator and a demodulator. The modulator is configured to modulate a to-be-sent low frequency baseband signal into a medium/high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 670A, the receiver 670B, or the like), or displays an image or a video by the display 694. In some embodiments, the modem processor may be an independent component. In some other embodiments, the modem processor may be independent of the processor 610, and is disposed in a same device as the mobile communications module 650 or another functional module.

The wireless communications module 660 may provide a wireless communications solution that is applied to the electronic device 600 and that includes wireless local area networks (WLAN) (for example, a wireless fidelity (Wi-Fi) network), Bluetooth (BT), a global navigation satellite system (GNSS), frequency modulation (FM), a near field communication (NFC) technology, an infrared (IR) technology, and the like. The wireless communications module 660 may be one or more devices that integrate at least one communication processing module. The wireless communications module 660 receives an electromagnetic wave through the antenna 2, performs frequency modulation and filtering processing on an electromagnetic wave signal, and sends a processed signal to the processor 610. The wireless communications module 660 may further receive a to-be-sent signal from the processor 610, perform frequency modulation and amplification on the signal, and convert a processed signal into an electromagnetic wave for radiation through the antenna 2.

In some embodiments, the antenna 1 and the mobile communications module 650 in the electronic device 600 are coupled, and the antenna 2 and the wireless communications module 660 in the electronic device 600 are coupled, so that the electronic device 600 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or satellite based augmentation systems (SBAS).

The internal memory 621 may be configured to store computer-executable program code. The executable program code includes instructions. The internal memory 621 may include a program storage area and a data storage area. The program storage area may store an operating system, an application required by at least one function (for example, a voice playing function or an image playing function), and the like. The data storage area may store data (for example, audio data and an address book) created in a process of using the electronic device 600, and the like. In addition, the internal memory 621 may include a high-speed random access memory, or may include a nonvolatile memory, for example, at least one magnetic disk storage device, a flash memory, or a universal flash storage (UFS). The processor 610 executes various function applications and data processing of the electronic device 600 by running the instructions stored in the internal memory 621 and/or the instructions stored in the memory disposed in the processor.

The data storage area of the internal memory 621 may store a DB file in embodiments of this application.

In a possible implementation, a computer program for implementing a DB file backup method in embodiments of this application may be stored in the program storage area of the internal memory 621, and the processor 610 invokes the computer program from the internal memory 621 for running. In a running process, the DB file is invoked from the internal memory 621 for processing, and the communication module such as the mobile communications module 650 or the wireless communications module 660 communicates with a server side, to implement a cloud backup of the DB file.

It should be understood that the electronic device 600 shown in FIG. 6 can implement processes of a DB file backup method provided in embodiments of this application. For details, refer to descriptions in the method embodiments shown in FIG. 7 to FIG. 9a in this application. To avoid repetition, detailed descriptions are properly omitted herein.

Figure 7:
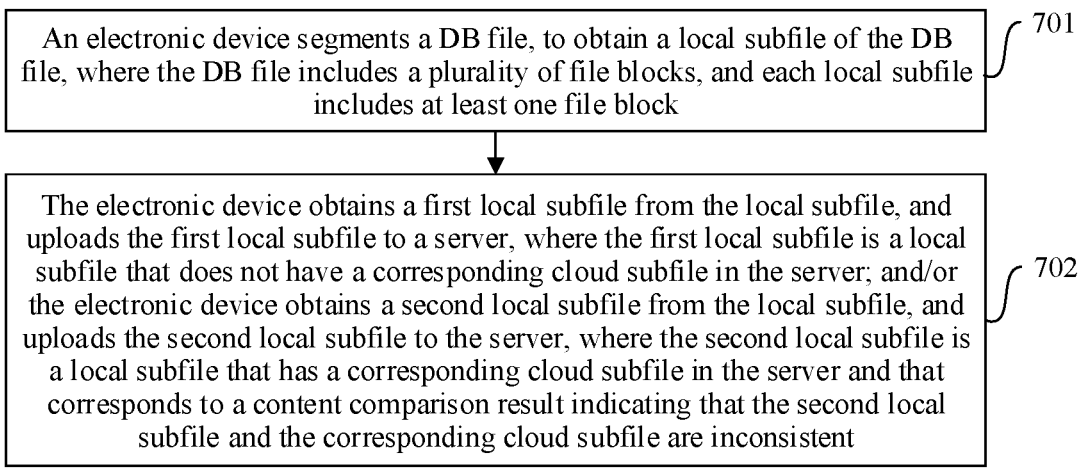
FIG. 7 is a flowchart of an embodiment of a DB file backup method according to this application.

Based on the foregoing system architecture and the structure of the electronic device, a flowchart in an embodiment of the DB file backup method in this application is shown in FIG. 7. The method may include the following steps.

Step 701: An electronic device segments a DB file, to obtain a local subfile of the DB file, where the DB file includes a plurality of file blocks, and each local subfile includes at least one file block.

For an implementation of this step, refer to the foregoing related descriptions of segmenting the DB file. Details are not described herein again.

Step 702: The electronic device obtains a first local subfile from the local subfile, and uploads the first local subfile to a server, where the first local subfile is a local subfile that does not have a corresponding cloud subfile in the server; and/or the electronic device obtains a second local subfile from the local subfile, and uploads the second local subfile to the server, where the second local subfile is a local subfile that has a corresponding cloud subfile in the server and that corresponds to a content comparison result indicating that the second local subfile and the corresponding cloud subfile are inconsistent, where the local subfile and a corresponding cloud subfile occupy a same file block.

That the local subfile and the corresponding cloud subfile occupy a same file block is used to indicate an ownership relationship of a file block, and is unrelated to whether the file block stores data. For example, the local subfile occupies a file block 1, and it indicates that the file block 1 belongs to the local subfile. In other words, the local subfile includes the file block 1, and is unrelated to whether the file block 1 stores data.

That the local subfile and the corresponding cloud subfile occupy a same file block means that a file block included in the local subfile and a file block included in the corresponding cloud subfile are a same file block, and that the file block included in the local subfile and the file block included in the corresponding cloud subfile are a same file block herein is unrelated to whether data is stored in the file blocks and whether the file blocks store same data, and is only related to the file blocks. For example, it is assumed that a local subfile 1 includes only the file block 1 in the DB file and a cloud subfile 1 also includes only the file block 1 in the DB file. Therefore, the local subfile 1 and the cloud subfile 1 occupy a same file block. This is unrelated to whether data is stored in the file block 1 of the local subfile 1, whether data is stored in the file block 1 of the cloud subfile 1, and whether the file block 1 of the local subfile 1 and the file block 1 of the cloud subfile 1 store same data.

A content comparison made by the electronic device between the local subfile and the corresponding cloud subfile may be implemented by comparing file fingerprints of the two subfiles. Specifically, the two subfiles have same content if the file fingerprints are the same, and the two subfiles have different content if the file fingerprints are different.

In the method shown in FIG. 7, the DB file is segmented into subfiles. Only a local subfile that does not have a corresponding cloud subfile in the server and/or a local subfile whose content changes are/is uploaded each time, and a local subfile whose content does not change is not uploaded. Compared with the conventional technology in which the entire DB file is uploaded, in the method, an amount of data that is uploaded from the DB file is reduced, and cloud backup performance of the DB file is optimized.

It can be learned from the descriptions of a segmentation rule of a DB file that the segmentation rule may indicate regularity, including the foregoing equal segmentation rule and the unequal segmentation rule indicating definite regularity. The following describes, by using an embodiment shown in FIG. 8a, a possible implementation in embodiments of this application in an implementation in which the segmentation rule indicates regularity. Referring to a flowchart in the embodiment shown in FIG. 8a, the method may include the following steps.

Step 801: An electronic device starts a cloud backup of a DB file, determines whether a cloud backup of the DB file is made for a first time, and performs step 802 if the cloud backup of the DB file is made for the first time, or perform step 804 if the cloud backup of the DB file is not made for the first time.

In a possible implementation, to determine whether the cloud backup of the DB file is made for the first time, the electronic device may query whether a cloud file list of the DB file exists on a server side. The cloud file list of the DB file may be independently stored in the server, or may be used as a part of the cloud file list of the electronic device. If an occasion on which the electronic device starts the cloud backup of the DB file each time is usually that a cloud backup instruction for the DB file is received, the cloud file list of the DB file is usually independently stored in the server; or if an occasion on which the electronic device starts the cloud backup of the DB file each time is usually an overall cloud backup, the cloud file list of the DB file may be stored in the cloud file list of the electronic device, and is a part of the cloud file list of the electronic device.

In another possible implementation, a recent file list that is of the cloud backup of the DB file and that is uploaded to the cloud may be recorded in the electronic device. To determine whether the cloud backup of the DB file is made for the first time, the electronic device may query whether the electronic device stores the recent file list of the cloud backup of the DB file. Similarly, the file list may be independently stored, or may be used as a part of a file list that is of a recent overall cloud backup and that is uploaded to the cloud, which may be specifically related to an occasion on which the electronic device starts the cloud backup of the DB file.

In still another possible implementation, information about whether the cloud backup of the DB file is made may be recorded in the electronic device. To determine whether the cloud backup of the DB file is made for the first time, the electronic device may query the information. Similarly, the information may be independently stored, or may be indirectly implemented based on information that is about whether the overall cloud backup is made and that is recorded in the electronic device, which may be specifically related to an occasion on which the electronic device starts the cloud backup of the DB file.

Step 802: The electronic device segments the DB file, to obtain a local subfile of the DB file, allocates a file identifier (ID, Identity) to each local subfile, calculates a file fingerprint of each local subfile, generates a local file list of the DB file based on the file ID and the file fingerprint, and sends the local subfile (namely, a first local subfile obtained by the electronic device) and the local file list to the server.

For an implementation in which the electronic device segments the DB file, to obtain the local subfile of the DB file, refer to corresponding descriptions in the foregoing embodiments. Details are not described herein again.

When allocating the file ID to the local subfile, the electronic device may allocate the file ID to the local subfile based on a ranking of a file block occupied by the local subfile. For example, FIG. 5a is used as an example. It is assumed that the DB file is f4. Therefore, a file ID f41 may be allocated to a local subfile that occupies file blocks 1 to 4, a file ID f42 may be allocated to a local subfile that occupies file blocks 5 to 8, and so on. An arrangement ranking of the local subfile may be learned of based on the file ID of the local subfile, and further, an arrangement ranking of a file block in the local subfile may be learned of. The foregoing is merely an example. In an actual application, a specific rule for allocating the file ID to the local subfile is not limited in this application.

It should be noted that, for a same file block of a same DB file, a same segmentation rule and a same file ID allocation rule need to be followed each time a backup is made, so that each time the DB file is segmented, a same file ID is allocated to local subfiles occupying a same file block. Therefore, a cloud subfile that has a same file ID as the local subfile and that matches the local subfile in a subsequent step is a cloud subfile that correspondingly occupies a same file block as the local subfile, so that a subsequent content comparison is a comparison of whether data stored in the same file block is still the same. This content comparison is more meaningful. For example, referring to FIG. 5a, it is assumed that the DB file is f4 and includes 16 file blocks. When the cloud backup is made for the first time, every four file blocks are classified into one local subfile, to obtain a local subfile f41 occupying file blocks 1 to 4, a local subfile f42 occupying file blocks 5 to 8, a local subfile f43 occupying file blocks 9 to 12, and a local subfile f44 occupying file blocks 13 to 16. Then, the local subfiles f41 to f44 are uploaded to the cloud. Therefore, when the DB file is segmented each time a cloud backup is made subsequently, a same segmentation rule and a same file ID allocation rule are preferably followed, so as to obtain the local subfiles f41 to f44 through segmentation. In a subsequent step, there are cloud subfiles that occupy a same file block, that have same file IDs as the local subfiles f41 to f44, and that respectively correspond to the local subfiles f41 to f44, and then a content comparison is made.

The local file list of the DB file may include a file ID and a file fingerprint of the local subfile. In a possible implementation, the local file list may be implemented in a form of a B+ tree. As shown in FIG. 8b, the DB file has a name of f4, and is segmented into four local subfiles, the four local subfiles are respectively f41, f42, f43, and f44, and each local subfile corresponds to a respective file fingerprint.

In an actual application, the cloud backup of the DB file may be a part of the overall cloud backup. Therefore, the local file list of the DB file may be stored in a B+ tree of an electronic device, and is used as a part of the B+ tree of the electronic device, as shown in FIG. 8c.

Step 803: The server receives and stores the local subfile and the local file list. This process ends.

Step 804: The electronic device obtains the cloud file list of the DB file from the server.

The cloud file list of the DB file may be a part of the cloud file list of the electronic device. If the occasion of starting the cloud backup of the DB file in step 801 is the overall cloud backup, in this step, the electronic device may obtain the cloud file list of the electronic device from the cloud, and further obtain the cloud file list of the DB file from the cloud file list of the electronic device. Alternatively, if the occasion of starting the cloud backup of the DB file in step 701 is that the cloud backup instruction for the DB file is received, and the cloud backup of the DB file is independently made, in this step, the electronic device may directly obtain the cloud file list of the DB file from the cloud.

Step 805: Compare the local file list of the DB file and the cloud file list; for a file ID that exists only in the local file list and that does not exist in the cloud file list, upload, to the server, a local subfile (namely, the first local subfile obtained by the electronic device) identified by the file ID; for a file ID included in both the local file list and the cloud file list, determine, through comparison, whether file fingerprints of the file ID in the two file lists are the same; if file fingerprints of the file ID in the two file lists are not the same, upload, to the server, the local subfile (namely, a second local subfile obtained by the electronic device) identified by the file ID; upload the local file list to the server; and perform step 806.

If the file ID exists only in the local file list and does not exist in the cloud file list, it indicates that a file block occupied by the local subfile corresponding to the file ID is a file block newly allocated by the electronic device to the DB file after a previous cloud backup. Therefore, the local subfile is directly uploaded. Otherwise, if the file ID exists in both the local file list and the cloud file list, it indicates that the local subfile and the cloud subfile that correspond to the file ID occupy a same file block. Therefore, a content comparison is made based on the file fingerprint, and whether to upload the local subfile is determined based on a comparison result.

Step 806: The server receives the local subfile and the local file list, and updates the cloud subfile and the cloud file list.

Figure 8A:
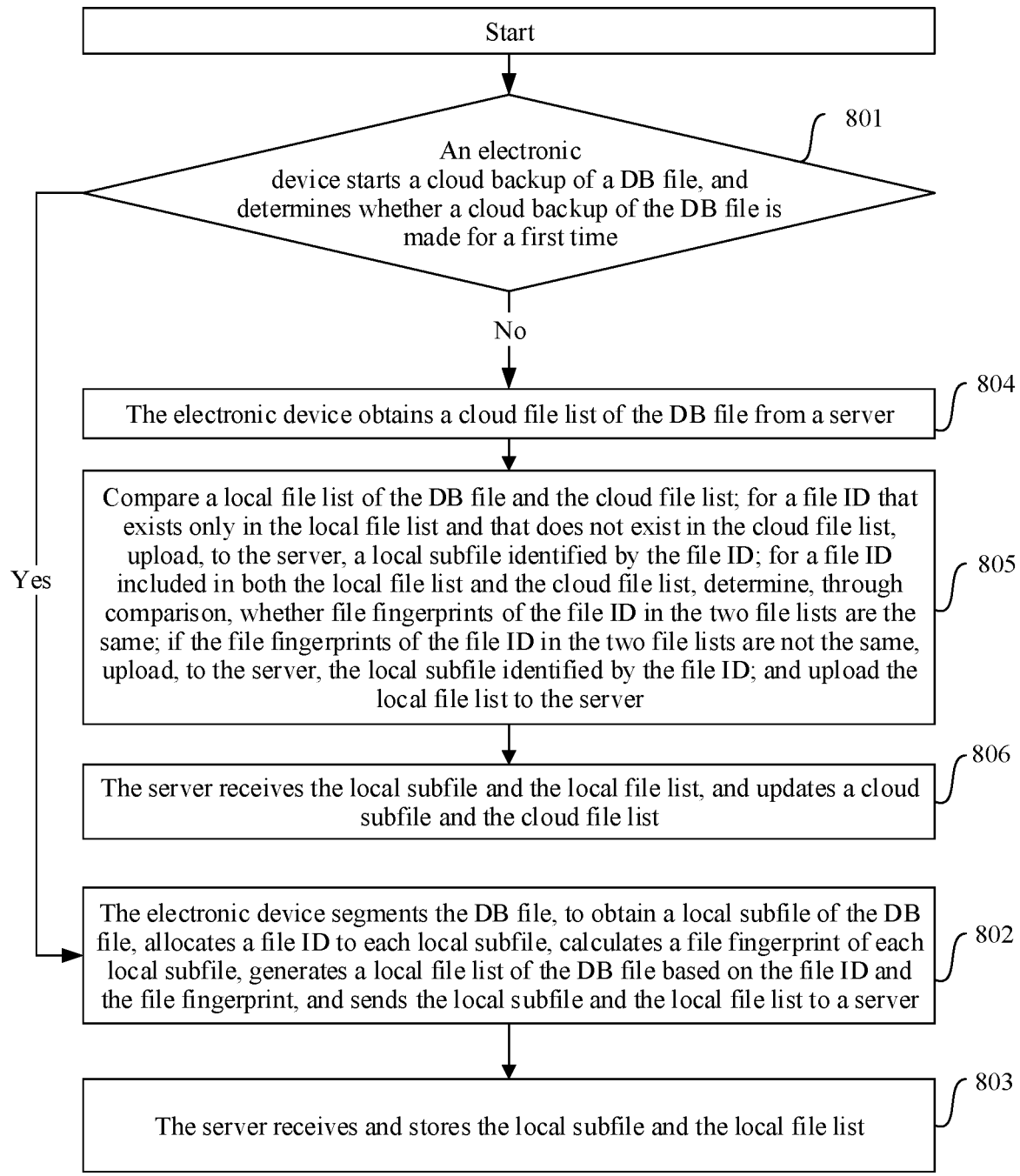
FIG. 8a is a flowchart of another embodiment of a DB file backup method according to this application.
Figure 8B:
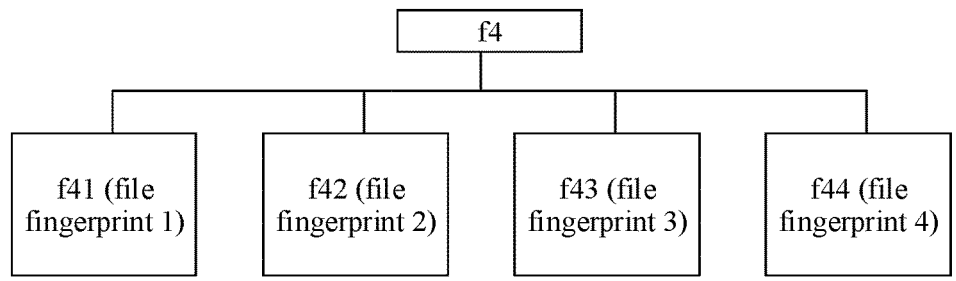
FIG. 8b is an exemplary diagram of a file list of a DB file according to this application.
Figure 8C:
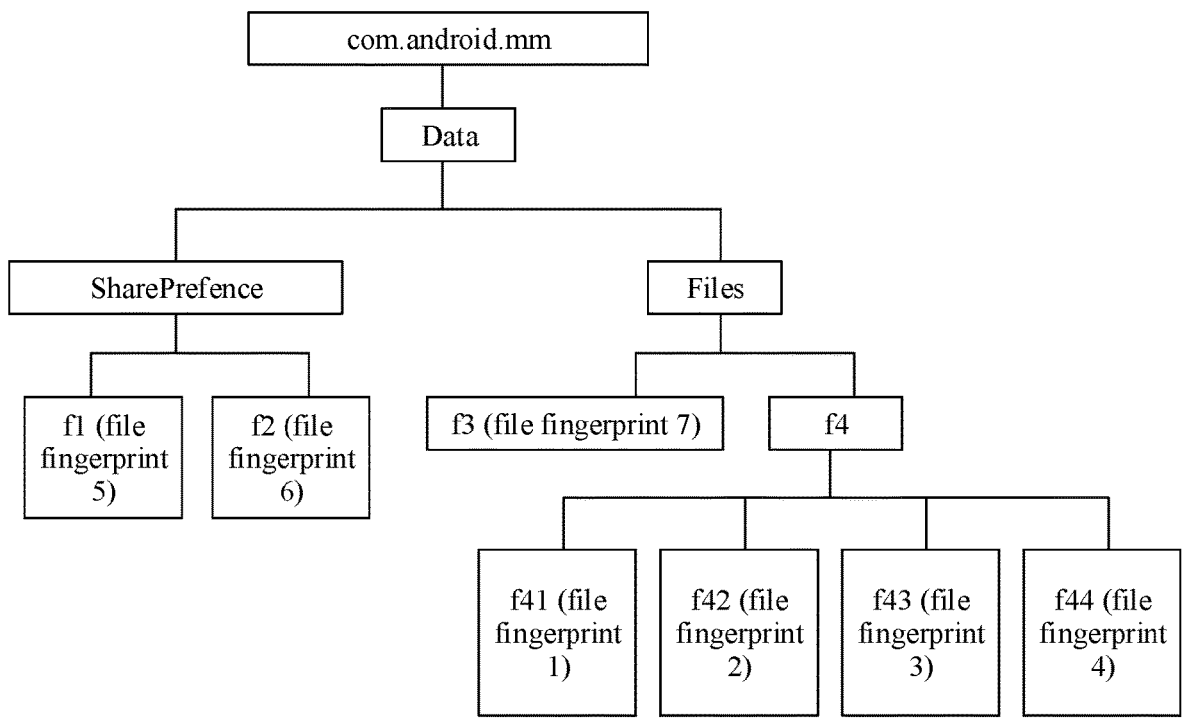
FIG. 8c is an exemplary diagram of a file list of an overall backup of an electronic device according to this application.

In the method shown in FIG. 8*a*, a same segmentation rule and a same file ID allocation rule are followed for a same file block in the DB file each time a cloud backup is performed, and a content comparison is made between a local subfile and a cloud subfile that have a same file ID, if the local subfile and the cloud subfile have same content, it indicates that content does not change, and the local subfile is not uploaded; and if the local subfile and the cloud subfile have different content, it indicates that content changes, and the local subfile is uploaded. In this way, the local subfile is selectively uploaded instead of uploading the entire DB file, to reduce an amount of data of the cloud backup of the DB file, and improve cloud backup performance of the DB file.

It can be learned from the descriptions of the segmentation rule of the DB file that the segmentation rule may indicate disorder. The following describes, by using an embodiment shown in FIG. 9*a*, a possible implementation in embodiments of this application in an implementation in which the segmentation rule indicates disorder. Referring to a flowchart in the embodiment shown in FIG. 9*a*, the method may include the following steps.

For an implementation of step 901 to step 903, refer to step 801 to step 803. A difference mainly lies in that an electronic device segments a DB file in a randomly disordered manner in step 902. For example, for a quantity of file blocks included in each local subfile, a value is randomly selected from 1 to n, or the like, provided that the DB file is segmented into local subfiles. FIG. 5*d* is still used as an example. The DB file may be segmented into the local subfiles in a completely disordered manner similar to the segmentation rule in FIG. 5*d*.

Correspondingly, a local file list generated in step 902 may further include a file block ID of a file block occupied by a local subfile. FIG. 5*d* is still used as an example. It is assumed that the local file list of the DB file is still implemented in a form of a B+ tree. Therefore, the local file list of the DB file may be shown in FIG. 9*b*.

The following describes steps 904 to 908 that are performed when a determining result in step 901 is no, to be specific, is that a cloud backup of the DB file is not performed for a first time.

Step 904: The electronic device obtains a cloud file list of the DB file from a server, determines whether a file block ID of a file block occupied by the DB file includes a file block ID that is not recorded in the cloud file list; and performs step 905 if the file block ID of the file block occupied by the DB file includes a file block ID that is not recorded in the cloud file list; or performs step 906 if the file block ID of the file block occupied by the DB file does not include a file block ID that is not recorded in the cloud file list.

Step 905: For a file block whose file block ID is recorded in the cloud file list of the DB file, the electronic device segments the DB file based on the cloud file list, to obtain a local subfile and a file ID of each local subfile, and calculates a file fingerprint of each local subfile; for a file block whose file block ID is not recorded in the cloud file list of the DB file, the electronic device segments the DB file, to obtain a local subfile, allocates a file ID to the obtained local subfile, and calculates a file fingerprint of each local subfile; and the electronic device generates the local file list of the DB file, and performs step 907.

An example is used to describe this step. It is assumed that the cloud file list of the DB file is shown in FIG. 9*b*, and the DB file includes file blocks 17 to 32 in addition to file blocks 1 to 16. Therefore, the file blocks 1 to 16 in the DB file are classified into local subfiles of a structure shown in FIG. 9*c*. However, the file blocks 17 to 32 may be classified into local subfiles, and a specific classification manner may be the same as or different from that of the file blocks 1 to 16, for example, may still be similar to disordered segmentation in step 902. As shown in FIG. 9*c*, it is assumed that the DB file is finally segmented into eight local subfiles shown in FIG. 9*c*. Therefore, a created local file list is shown in FIG. 9*d*.

Step 906: The electronic device segments the DB file based on a file ID recorded in the cloud file list and a file block ID corresponding to the file ID, to obtain the local subfile and the file ID of each local subfile, generates the local file list of the DB file, and performs step 907.

The examples in steps 902 to 905 are still used. The local file list generated in this step is still a structure shown in FIG. 9*b*, and a difference lies in that the file fingerprints of the local subfiles may be different.

Step 907: The electronic device compares the local file list of the DB file and the cloud file list; for a file ID that exists only in the local file list and that does not exist in the cloud file list, uploads, to the server, a local subfile (namely, the first local subfile obtained by the electronic device) identified by the file ID; for a file ID included in both the local file list and the cloud file list, determines, through comparison, whether file fingerprints of the file ID in the two file lists are the same; if file fingerprints of the file ID in the two file lists are not the same, uploads, to the server, the local subfile (namely, a second local subfile obtained by the electronic device) identified by the file ID; and uploads the local file list to the server. Step 908 is to be performed.

Step 908: The server receives the local subfile and the local file list, and updates the cloud subfile and the cloud file list.

Figure 9A:
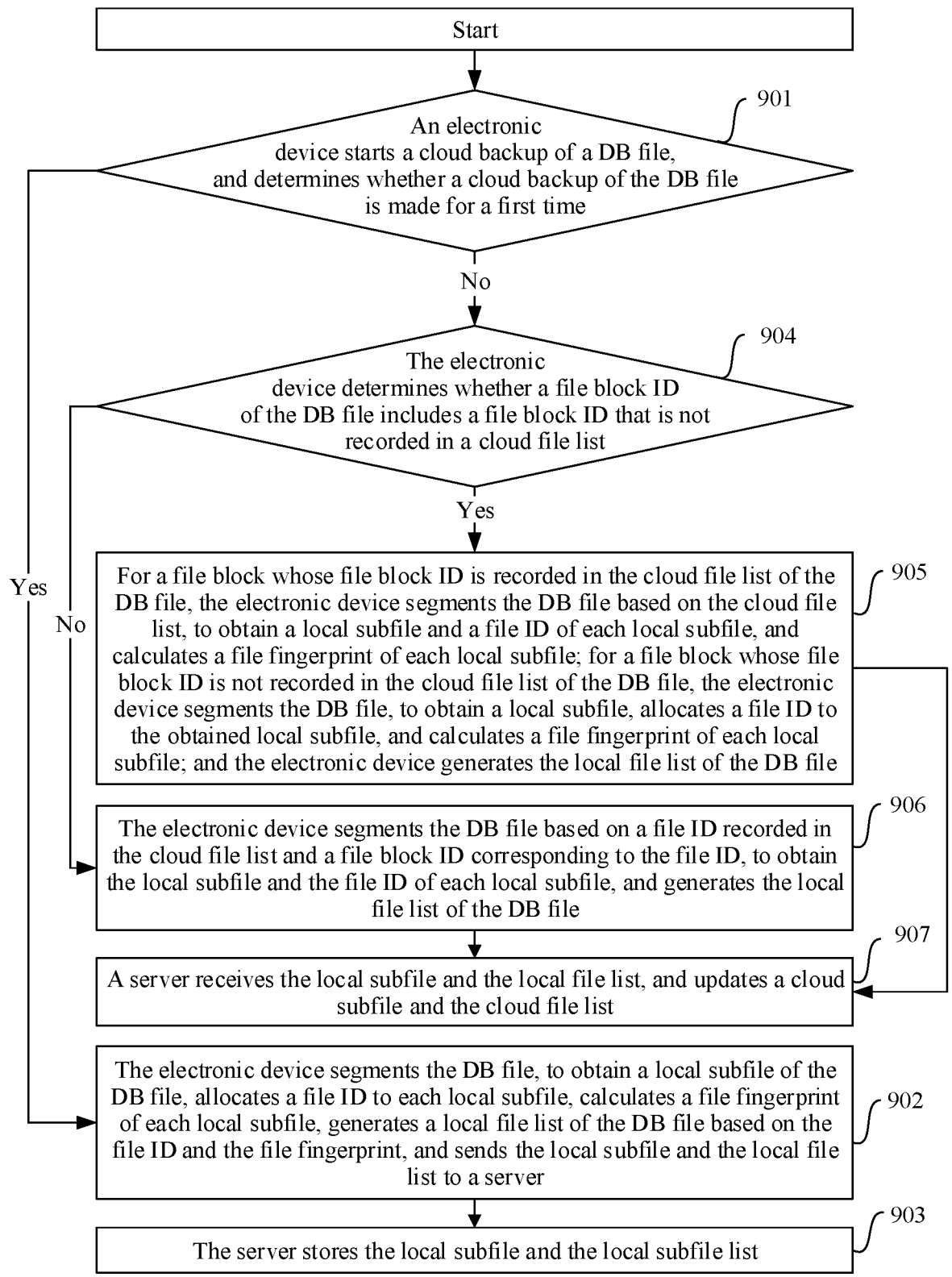
FIG. 9a is a flowchart of still another embodiment of a DB file backup method according to this application.
Figure 9B:
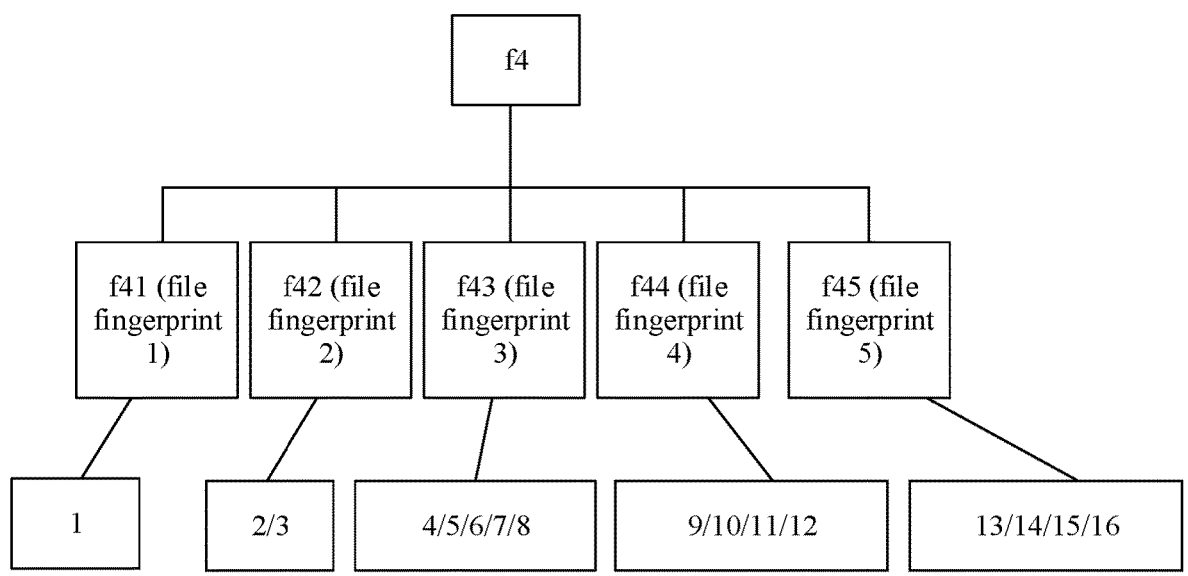
FIG. 9b is an exemplary diagram of a file list of a DB file according to this application.
Figure 9C:
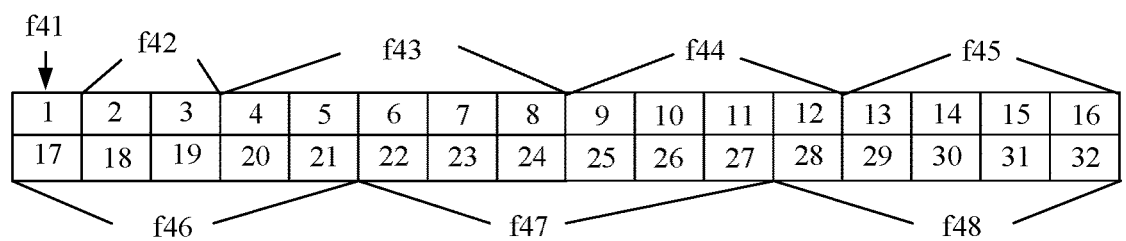
FIG. 9c is an exemplary diagram of a DB file segmentation method according to an embodiment of this application.
Figure 9D:
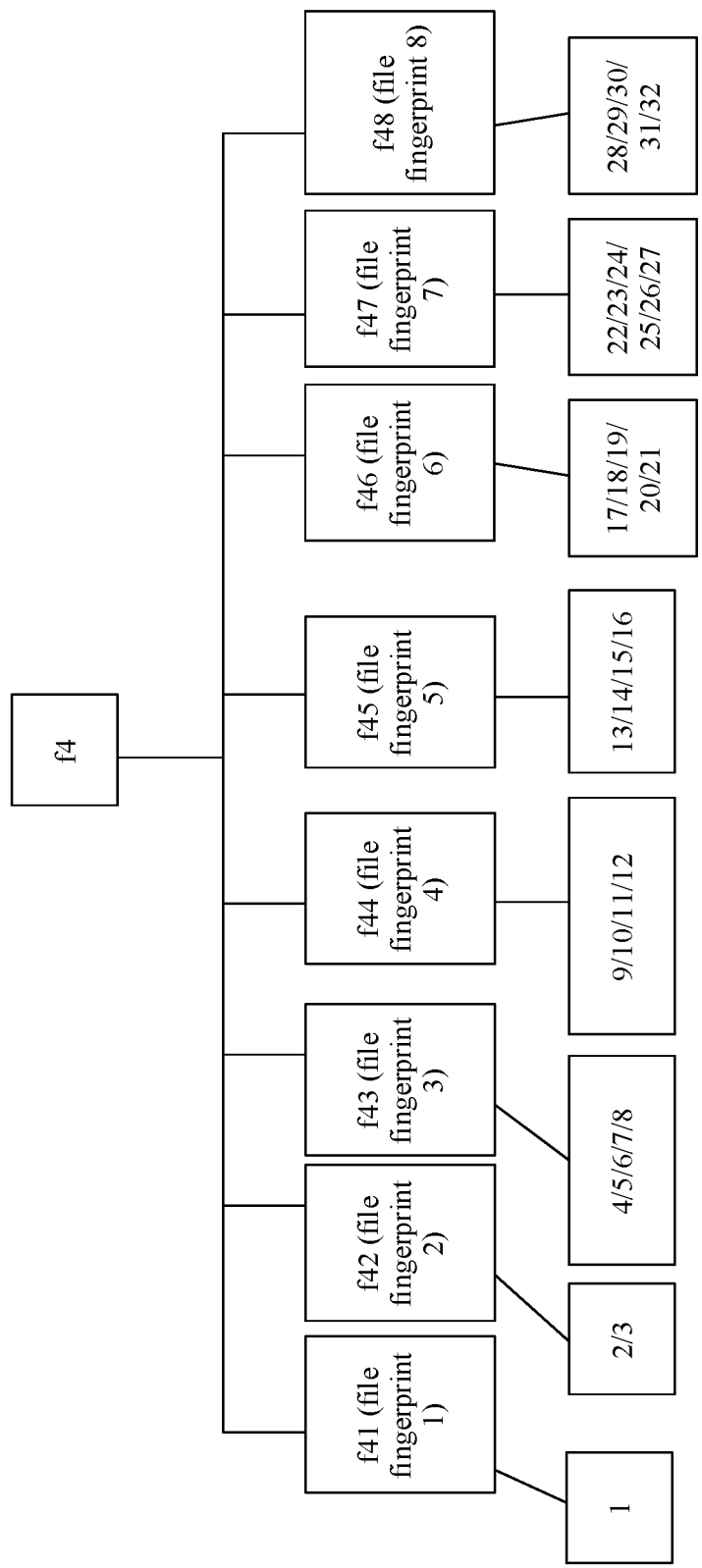
FIG. 9d is an exemplary diagram of a file list of a DB file according to an embodiment of this application.

It should be noted that, although the method shown in FIG. 9*a* is applicable to a case in which the segmentation rule is disordered in the foregoing descriptions, the method shown in FIG. 9*a* may also be applicable to an implementation in which the segmentation rule indicates regularity. Compared with a method procedure shown in FIG. 9*a*, a method procedure shown in FIG. 8*a* is simpler and easier to implement.

It should be noted that, in embodiments of this application shown in FIG. 8*a* and FIG. 9*a*, the cloud file list of the DB file is stored in the server. In another possible implementation, the cloud file list of the DB file may be stored in the electronic device. In this case, for example, in step 802, step 804, step 902, and step 907, the electronic device does not need to upload the local file list to the server, but directly updates the cloud file list of the DB file in the electronic device based on the local file list. Correspondingly, for example, in step 804 and step 904, the electronic device may directly obtain the cloud file list of the DB file from the electronic device, and does not need to obtain the cloud file list from the server, to reduce data exchange between the electronic device and the server, and further optimize cloud backup performance of the DB file.

It should be noted that, in the foregoing embodiments, the cloud backup of the DB file is used as an example to describe the DB file backup method in embodiments of this application. However, the DB file backup method in embodiments of this application may be extended to the backup of the DB file other than the cloud backup. In this case, the server in the foregoing embodiments may be extended from a cloud server to a server other than the cloud server, the cloud subfile may be extended to a server side subfile, and the cloud file list may be extended to the server side file list. For a specific implementation method, refer to the foregoing embodiments. Details are not described herein again.

It should be noted that, the DB file backup method in embodiments of this application may be further extended to a backup of a non-DB file. In other words, to make the backup of the non-DB file, the backup method in embodiments of this application may also be used.

It can be understood that some or all steps or operations in the foregoing embodiments are merely examples, and other operations or variations of various operations may be performed in embodiments of this application. In addition, steps may be performed in different sequences presented in the foregoing embodiments, and it is possible that not all operations in the foregoing embodiments need to be performed.

Figure 10:
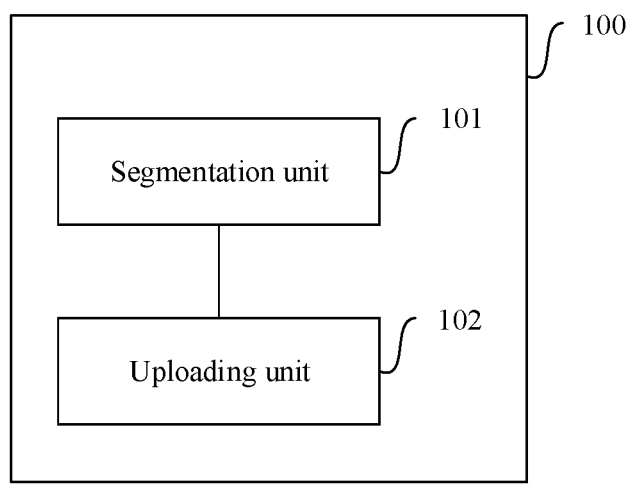
FIG. 10 is a schematic diagram of a structure in an embodiment of a DB file backup apparatus according to this application.

FIG. 10 is a schematic diagram of a structure in an embodiment of a DB file backup apparatus according to this application. As shown in FIG. 10, the apparatus 100 may include:

a segmentation unit 101, configured to segment a DB file, to obtain a local subfile of the DB file, where the DB file includes a plurality of file blocks, each local subfile includes at least one file block, and the file block is a storage unit of the DB file; and an uploading unit 102, configured to: obtain a first local subfile from the local subfile, and upload the first local subfile to a server, where the first local subfile is a local subfile that does not have a corresponding server side subfile in the server; and/or obtain a second local subfile from the local subfile, and upload the second local subfile to the server, where the second local subfile is a local subfile that has a corresponding server side subfile in the server and that corresponds to a content comparison result indicating that the second local subfile and the corresponding server side subfile are inconsistent.

The local subfile and a corresponding server side subfile occupy a same file block.

The uploading unit 102 may be further configured to: generate a local file list based on the local subfile, and obtain a server side file list of the DB file; and obtain the first local subfile and/or the second local subfile from the local subfile based on the local file list and the server side file list.

The local file list includes a file ID of the local subfile, and the server side file list includes a file ID of the server side subfile. The uploading unit 102 may be configured to: obtain, from the local subfile, a local subfile whose file ID exists only in the local file list, and use the local subfile as the first local subfile.

The local file list includes a file ID and a file fingerprint of the local subfile, and the server side file list includes a file ID and a file fingerprint of the server side subfile.

The uploading unit 102 may be configured to: obtain a local subfile whose file ID exists in both the local file list and the server side file list and whose file fingerprints corresponding to the file ID are inconsistent, and use the local subfile as the second local subfile.

The server side file list is stored in the apparatus, and the apparatus may further include:

an updating unit, configured to update, based on the local file list, the server side file list stored in the apparatus.

The segmentation unit 101 may be configured to: obtain the server side file list of the DB file, where the server side file list includes a file block ID of a file block occupied by a server side subfile of the DB file; determine whether a first file block exists in the DB file, where the first file block is a file block whose file block ID is not recorded in the server side file list; and if the first file block exists, classify the first file block according to a preset rule, and classify a file block other than the first file block in the DB file based on the server side file list; or if the first file block does not exist, segment the DB file based on the server side file list.

The apparatus provided in the embodiment shown in FIG. 10 may be configured to perform the technical solutions in the method embodiments shown in FIG. 7 to FIG. 9*a* in this application. For implementation principles and technical effects thereof, refer to related descriptions in the method embodiments.

It should be understood that division into units in the apparatus shown in FIG. 10 is merely logical function division. In an actual implementation, all or some units may be integrated into one physical entity, or may be physically separated. In addition, these units may be all implemented in a form of calling software by a processing element, may be all implemented in a form of hardware, or may be partially implemented in a form of calling software by a processing element. Some units are implemented in a form of hardware. For example, a segmentation unit may be an independently disposed processing element, or may be integrated into a chip of an electronic device. An implementation of another unit is similar to this. In addition, all or some of these units may be integrated together, or may be implemented independently. In an implementation process, steps in the foregoing methods or the foregoing units can be implemented by using a hardware integrated logical circuit in the processing element, or by using instructions in a form of software.

For example, the foregoing units may be one or more integrated circuits configured to implement the foregoing methods, for example, one or more application-specific integrated circuits (ASIC), one or more microprocessors (Digital Signal Processor, DSP), or one or more field programmable gate arrays (FPGA). For another example, these units may be integrated together, and are implemented in a form of a system-on-a-chip (SOC).

The electronic device in this embodiment of this application may be a mobile phone, and the mobile phone may include one or more processors, a memory, and one or more computer programs. The one or more computer programs are stored in the memory, the one or more computer programs include instructions, and when the instructions are executed by the mobile phone, the mobile phone is enabled to perform the steps in the methods shown in FIG. 7 to FIG. 9a.

This application further provides an electronic device. The device includes a storage medium and a central processing unit, the storage medium may be a nonvolatile storage medium, the storage medium stores a computer-executable program, and the central processing unit is connected to the nonvolatile storage medium, and executes the computer-executable program, to implement the methods provided in embodiments shown in FIG. 7 to FIG. 9a.

An embodiment of this application further provides a computer-readable storage medium. The computer-readable storage medium stores a computer program. When the computer program is run on a computer, the computer is enabled to perform the methods provided in embodiments shown in FIG. 7 to FIG. 9a in this application.

An embodiment of this application further provides a computer program product. The computer program product includes a computer program. When the computer program product runs on a computer, the computer is enabled to perform the methods provided in embodiments shown in FIG. 7 to FIG. 9a in this application.

In embodiments of this application, "at least one" means one or more, and "a plurality of" means two or more. The term "and/or" describes an association relationship for describing associated objects and indicates that three relationships may exist. For example, A and/or B may indicate the following three cases: only A exists, both A and B exist, and only B exists. A and B may be singular or plural. The character "/" generally indicates an "or" relationship between the associated objects. At least one of the following items and similar expressions refer to any combination of the items, including a single item or any combination of plural items. For example, at least one of a, b, and c may represent a, b, c, a and b, a and c, b and c, or a, b and c, where a, b, and c may be singular or plural.

A person of ordinary skill in the art may be aware that, with reference to the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief descriptions, for a detailed working process of the foregoing system, apparatus, and unit, refer to a corresponding process in the foregoing method embodiments, and details are not described herein again.

In the several embodiments provided in this application, when any function is implemented in a form of a software functional unit and sold or used as an independent product, the function may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods according to embodiments of this application. The foregoing storage medium includes: any medium that can store program code, such as a USB flash drive, a removable hard disk, a read-only memory (ROM), a random access memory (RAM), a magnetic disk, or a compact disc.

The foregoing descriptions are merely exemplary implementations of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A database (DB) file backup method, comprising:
   starting, by an electronic device, a cloud backup of a DB file, and determining, whether the cloud backup of the DB file is made for a first time;
   based on the cloud backup of the DB file being made for the first time,
      segmenting, by the electronic device, the DB file, to obtain local subfiles of the DB file, wherein the DB file comprises a plurality of file blocks, each local subfile comprises at least one file block, and the at least one file block is a storage unit of the DB file,
      obtaining, by the electronic device, a first local subfile,
      allocating a file identifier (ID) to each local subfile,
      determining a file fingerprint of each local subfile,
      generating a local file list of the DB file based on the file ID and the file fingerprint, and
      uploading the first local subfile and the local file list to a server;
   based on the cloud backup of the DB file not being made for the first time,
      obtaining, by the electronic device, a cloud file list of the DB file from the server,
      comparing, by the electronic device, the local file list of the DB file and the cloud file list; for a first file ID that exists only in the local file list but does not exist in the cloud file list, uploading to the server, the first local subfile which is associated with the first file ID; for a second file ID exists both in the local file list and the cloud file list, determining, whether file fingerprints of the second file ID in the local file list and the cloud file list are the same;
      based on the file fingerprints of the second file ID in the local file list and the cloud file list not being the same, uploading a second local subfile and the local file list to the server, wherein the second local subfile whose content changes is associated with the second file ID.

2. The method according to claim 1, wherein before obtaining, by the electronic device, at least one of the first local subfile or the second local subfile from the local subfiles, the method further comprises:
  generating, by the electronic device, the local file list based on the local subfiles, and obtaining a server side file list of the DB file, and
  wherein obtaining, by the electronic device, at least one of the first local subfile or the second local subfile from the local subfiles comprises:
  obtaining, by the electronic device, at least one of the first local subfile or the second local subfile from the local subfiles based on the local file list and the server side file list.

3. The method according to claim 2, wherein the local file list comprises a file ID of each local subfile, and the server side file list comprises a file ID of each server side subfile, and
  wherein obtaining, by the electronic device, the first local subfile from the local subfiles based on the local file list and the server side file list comprises:
  obtaining, by the electronic device from the local subfiles, a local subfile whose file ID exists only in the local file list, and using the local subfile whose file ID exists only in the local file list as the first local subfile.

4. The method according to claim 2, wherein the local file list comprises a file ID and a file fingerprint of each local subfile, and the server side file list comprises a file ID and a file fingerprint of each server side subfile, and
  wherein obtaining, by the electronic device, the second local subfile from the local subfiles based on the local file list and the server side file list comprises:
  obtaining, by the electronic device, a local subfile whose file ID exists in both the local file list and the server side file list and whose file fingerprints corresponding to the file ID in the local file list and the server side file list are inconsistent, and using the local subfile whose file ID exists in both the local file list and the server side file list and whose file fingerprints corresponding to the file ID in the local file list and the server side file list are inconsistent as the second local subfile.

5. The method according to claim 2, wherein the server side file list is stored in the electronic device; and after uploading, by the electronic device, at least one of the first local subfile or the second local subfile to the server, the method further comprises:
  updating, by the electronic device based on the local file list, the server side file list stored in the electronic device.

6. The method according to claim 1, wherein before segmenting, by the electronic device, the DB file, to obtain the local subfiles of the DB file, the method further comprises:
  obtaining, by the electronic device, a server side file list of the DB file, wherein the server side file list comprises a file block ID of a file block occupied by a server side subfile of the DB file, and
  wherein segmenting, by the electronic device, the DB file, to obtain the local subfiles of the DB file comprises:
  determining, by the electronic device, whether a file block other than a first file block exists in the DB file, wherein the first file block is a file block corresponding to the file block ID in the server side file list; and
  in response to a file block other than the first file block existing, classifying, by the electronic device, the file block other than the first file block according to a preset rule, and classifying the first file block based on the server side file list; or
  in response to no file block other than the first file block existing, segmenting, by the electronic device, the DB file based on the server side file list.

7. The method according to claim 1, wherein a same segmentation rule and a same file ID allocation rule are followed for a same file block in the DB file each time the cloud backup is performed.

8. The method according to claim 1, wherein a content comparison is performed between a local subfile and a cloud subfile that have a same file ID, and the method further comprises:
  based on the local subfile and the cloud subfile having the same content, which indicates that content has not changed, stopping uploading the local subfile; and
  based on the local subfile and the cloud subfile having different content, which indicates that content has changed, uploading the local subfile.

9. An electronic device, comprising:
  one or more processors;
  a memory; and
  one or more computer programs, wherein the one or more computer programs are stored in the memory, the one or more computer programs comprise instructions, and when the instructions are executed by the electronic device, the electronic device performs the following:
  starting, a cloud backup of a DB file, and determining, whether the cloud backup of the DB file is made for a first time;
  based on the cloud backup of the DB file being made for the first time,
    segmenting a database (DB) file, to obtain local subfiles of the DB file, wherein the DB file comprises a plurality of file blocks, each local subfile comprises at least one file block, and the at least one file block is a storage unit of the DB file, and
    obtaining a first local subfile,
    allocating a file identifier (ID) to each local subfile,
    determining a file fingerprint of each local subfile,
    generating a local file list of the DB file based on the file ID and the file fingerprint, and
    uploading the first local subfile and the local file list to a server;
  based on the cloud backup of the DB file not being made for the first time,
    obtaining, a cloud file list of the DB file from the server,
    comparing, the local file list of the DB file and the cloud file list; for a first file ID that exists only in the local file list but does not exist in the cloud file list, uploading to the server, the first local subfile which is associated with the first file ID; for a second file ID exists both in the local file list and the cloud file list, determining, whether file fingerprints of the second file ID in the local file list and the cloud file list are the same;
    based on the file fingerprints of the second file ID in the local file list and the cloud file list not being the same, uploading, uploading a second local subfile and the local file list to the server, wherein the second local subfile whose content changes is associated with the second file ID.

10. The electronic device according to claim 9, wherein when the instructions are executed by the electronic device, before the electronic device is caused to obtain at least one of the first local subfile or the second local subfile from the local subfiles, the electronic device is further caused to perform:

generating the local file list based on the local subfiles, and obtaining a server side file list of the DB file, and wherein the electronic device is caused to obtain at least one of the first local subfile or the second local subfile from the local subfiles comprises:

obtaining at least one of the first local subfile or the second local subfile from the local subfiles based on the local file list and the server side file list.

11. The electronic device according to claim 10, wherein the local file list comprises a file ID of each local subfile, and the server side file list comprises a file ID of each server side subfile, and wherein when the instructions are executed by the electronic device, the electronic device is caused to obtain the first local subfile from the local subfiles based on the local file list and the server side file list comprises:

obtaining, from the local subfiles, a local subfile whose file ID exists only in the local file list, and using the local subfile whose file ID exists only in the local file list as the first local subfile.

12. The electronic device according to claim 10, wherein the local file list comprises a file ID and a file fingerprint of each local subfile, and the server side file list comprises a file ID and a file fingerprint of each server side subfile, and wherein when the instructions are executed by the electronic device, the electronic device is caused to obtain the second local subfile from the local subfiles based on the local file list and the server side file list comprises:

obtaining a local subfile whose file ID exists in both the local file list and the server side file list and whose file fingerprints corresponding to the file ID in the local file list and the server side file list are inconsistent, and using the local subfile whose file ID exists in both the local file list and the server side file list and whose file fingerprints corresponding to the file ID in the local file list and the server side file list are inconsistent as the second local subfile.

13. The electronic device according to claim 10, wherein the server side file list is stored in the electronic device, and wherein when the instructions are executed by the electronic device, after the electronic device is caused to upload at least one of the first local subfile or the second local subfile to the server, the electronic device is further caused to:

update, based on the local file list, the server side file list stored in the electronic device.

14. The electronic device according to claim 9, wherein when the instructions are executed by the electronic device, before the electronic device is caused to segment the DB file, to obtain the local subfiles of the DB file, the electronic device is further caused to perform:

obtaining a server side file list of the DB file, wherein the server side file list comprises a file block ID of a file block occupied by a server side subfile of the DB file, and wherein the electronic device is caused to segment the DB file, to obtain the local subfiles of the DB file comprises:

determining whether a file block other than a first file block exists in the DB file, wherein the first file block is a file block corresponding to the file block ID in the server side file list; and in response to a file block other than the first file block existing, classifying the file block other than the first file block according to a preset rule, and classifying the first file block based on the server side file list; or in response to no file block other than the first file block existing, segmenting the DB file based on the server side file list.

15. A non-transitory computer-readable medium having computer-executable instructions stored thereon that, when executed by a processor, cause an apparatus to:

start, a cloud backup of a databased (DB) file, and determine, whether the cloud backup of the DB file is made for a first time;

based on the cloud backup of the DB file being made for the first time, segment the DB file, to obtain local subfiles of the DB file, wherein the DB file comprises a plurality of file blocks, each local subfile comprises at least one file block, and the at least one file block is a storage unit of the DB file, and obtain a first local subfile, allocate a file identifier (ID) to each local subfile, determine a file fingerprint of each local subfile, generate a local file list of the DB file based on the file ID and the file fingerprint, and upload the first local subfile and the local file list to a server;

based on the cloud backup of the DB file not being made for the first time, obtain, a cloud file list of the DB file from the server, compare, the local file list of the DB file and the cloud file list; for a first file ID that exists only in the local file list but does not exist in the cloud file list, upload to the server, the first local subfile which is associated with the first file ID; for a second file ID exists both in the local file list and the cloud file list, determine, whether file fingerprints of the second file ID in the local file list and the cloud file list are the same;

based on the file fingerprints of the second file ID in the local file list and the cloud file list not being the same, upload, uploading a second local subfile and the local file list to the server, wherein the second local subfile whose content changes is associated with the second file ID.

16. The non-transitory computer-readable medium according to claim 15, wherein when the instructions are executed by the processor, before the apparatus is caused to obtain at least one of the first local subfile or the second local subfile from the local subfiles, the apparatus is further caused to:

generate the local file list based on the local subfiles, and obtain a server side file list of the DB file, and wherein the apparatus is caused to obtain at least one of the first local subfile or the second local subfile from the local subfiles comprises:

obtaining at least one of the first local subfile or the second local subfile from the local subfiles based on the local file list and the server side file list.

17. The non-transitory computer-readable medium according to claim 16, wherein the local file list comprises a file ID of each local subfile, and the server side file list comprises a file ID of each server side subfile, and wherein when the instructions are executed by the processor, the apparatus is caused to obtain the first local subfile from the local subfiles based on the local file list and the server side file list comprises:

obtaining, from the local subfiles, a local subfile whose file ID exists only in the local file list, and using the local subfile whose file ID exists only in the local file list as the first local subfile.

18. The non-transitory computer-readable medium according to claim 16, wherein the local file list comprises a file ID and a file fingerprint of each local subfile, and the server side file list comprises a file ID and a file fingerprint of each server side subfile, and
- wherein when the instructions are executed by the processor, the apparatus is caused to obtain the second local subfile from the local subfiles based on the local file list and the server side file list comprises:
- obtaining a local subfile whose file ID exists in both the local file list and the server side file list and whose file fingerprints corresponding to the file ID in the local file list and the server side file list are inconsistent, and using the local subfile whose file ID exists in both the local file list and the server side file list and whose file fingerprints corresponding to the file ID in the local file list and the server side file list are inconsistent as the second local subfile.

19. The non-transitory computer-readable medium according to claim 16, wherein the server side file list is stored in the non-transitory computer-readable medium, and
- wherein when the instructions are executed by the processor, after the apparatus is caused to upload at least one of the first local subfile or the second local subfile to the server, the apparatus is further caused to perform:
- updating, based on the local file list, the server side file list stored in the non-transitory computer-readable medium.

20. The non-transitory computer-readable medium according to claim 15, wherein when the instructions are executed by the processor, before the apparatus is caused to segment the DB file, to obtain the local subfiles of the DB file, the apparatus is further caused to:
- obtain a server side file list of the DB file, wherein the server side file list comprises a file block ID of a file block occupied by a server side subfile of the DB file, and
- wherein the apparatus is caused to segment the DB file, to obtain the local subfiles of the DB file comprises:
- determining whether a file block other than a first file block exists in the DB file, wherein the first file block is a file block corresponding to the file block ID in the server side file list; and
- in response to a file block other than the first file block existing, classifying the file block other than the first file block according to a preset rule, and classifying the first file block based on the server side file list; or
- in response to no file block other than the first file block exists, segmenting the DB file based on the server side file list.

* * * * *